US008672733B2

(12) United States Patent
Chen et al.

(10) Patent No.: US 8,672,733 B2
(45) Date of Patent: Mar. 18, 2014

(54) VENTILATION AIRFLOW RATE CONTROL

(75) Inventors: Jie Chen, St. Charles, MO (US); Aaron D. Herzon, Ballwin, MO (US); Allan J. Reifel, Florissant, MO (US); Yi Chen, St. Charles, MO (US)

(73) Assignee: Nordyne LLC, O'Fallon, MO (US)

( * ) Notice: Subject to any disclaimer, the term of this patent is extended or adjusted under 35 U.S.C. 154(b) by 1993 days.

(21) Appl. No.: 11/703,518

(22) Filed: Feb. 6, 2007

(65) Prior Publication Data

US 2008/0188173 A1      Aug. 7, 2008

(51) Int. Cl.
F24F 11/00 (2006.01)
F24F 11/02 (2006.01)
F24F 7/00 (2006.01)

(52) U.S. Cl.
USPC ............................. 454/239; 62/230; 236/49.3

(58) Field of Classification Search
USPC .......................................... 454/239; 318/461
See application file for complete search history.

(56) References Cited

U.S. PATENT DOCUMENTS

| | | |
|---|---|---|
| 3,898,439 A | 8/1975 | Reed et al. |
| 3,911,339 A | 10/1975 | Rettig |
| 4,015,182 A | 3/1977 | Erdman |
| 4,099,553 A | 7/1978 | Burnham et al. |
| 4,169,990 A | 10/1979 | Lerdman |
| 4,209,943 A | 7/1980 | Moeller et al. |
| 4,250,544 A | 2/1981 | Alley |
| 4,257,238 A | 3/1981 | Kountz et al. |
| 4,298,943 A | 11/1981 | Tompson et al. |
| 4,337,848 A | 7/1982 | Kindler |
| 4,346,434 A | 8/1982 | Morinaga |
| 4,358,725 A | 11/1982 | Brendemuehl |
| 4,390,826 A | 6/1983 | Erdman et al. |
| 4,407,139 A | 10/1983 | Ide et al. |
| 4,408,713 A | 10/1983 | Iijima et al. |
| 4,415,844 A | 11/1983 | Mendenhall et al. |
| 4,420,947 A | 12/1983 | Yoshino |

(Continued)

FOREIGN PATENT DOCUMENTS

| | | |
|---|---|---|
| CA | 1146650 | 5/1983 |
| CA | 2034375 | 10/2001 |

(Continued)

OTHER PUBLICATIONS

Siemens, Unit Conditioner Heating and Cooling Controller With Multi-Speed Fan, On/Off Switch and Occupancy Sensor, Technical Specification Sheet, Document No. 149-427P25, Rev. 1, Sep. 2001.

*Primary Examiner* — Steven B McAllister
*Assistant Examiner* — Helena Kosanovic
(74) *Attorney, Agent, or Firm* — Bryan Cave LLP

(57) ABSTRACT

Airflow rates within a ventilation system are controlled using motor speed or torque and motor electric current or pressure. Fan speed or torque may be varied to compensate for differing restriction in ductwork, and may provide a constant airflow rate over a range of varying airflow restriction. Air handlers or air conditioning units may be mass produced in common configurations, and installed in different buildings or structures with different ductwork configurations. Methods operate a fan motor at a present speed or torque, sample speed or torque, sample current of the fan motor or pressure within the ventilation system, calculate a present airflow rate within the ventilation system, calculate a new input setting using the present airflow rate and a target airflow rate, change the speed or torque to the new input setting, and repeat these steps to converge on the target airflow rate, often avoiding overshoot.

26 Claims, 6 Drawing Sheets

(56) References Cited

U.S. PATENT DOCUMENTS

| | | |
|---|---|---|
| 4,421,268 A | 12/1983 | Bassett et al. |
| 4,434,390 A | 2/1984 | Elms |
| 4,457,706 A | 7/1984 | Finke et al. |
| 4,459,519 A | 7/1984 | Erdman |
| 4,460,035 A | 7/1984 | Mizote et al. |
| 4,467,706 A | 8/1984 | Batcheller et al. |
| 4,467,998 A | 8/1984 | Spence |
| 4,486,837 A | 12/1984 | Kojima et al. |
| 4,487,363 A | 12/1984 | Parker et al. |
| 4,495,450 A | 1/1985 | Tokizaki et al. |
| 4,500,034 A | 2/1985 | Reese et al. |
| 4,500,821 A | 2/1985 | Bitting et al. |
| 4,507,932 A | 4/1985 | Suzuki et al. |
| 4,530,395 A | 7/1985 | Parker et al. |
| 4,540,921 A | 9/1985 | Boyd, Jr. et al. |
| 4,543,793 A | 10/1985 | Chellis et al. |
| 4,576,012 A | 3/1986 | Luzenberg |
| 4,589,060 A | 5/1986 | Zinsmeyer |
| 4,590,779 A | 5/1986 | Stange et al. |
| 4,604,036 A | 8/1986 | Sutou et al. |
| 4,605,160 A | 8/1986 | Day |
| 4,616,325 A | 10/1986 | Heckenbach et al. |
| 4,630,221 A | 12/1986 | Heckenbach et al. |
| 4,636,936 A | 1/1987 | Boyd, Jr. et al. |
| 4,638,233 A | 1/1987 | Erdman |
| 4,642,536 A | 2/1987 | Boyd, Jr. et al. |
| 4,642,537 A | 2/1987 | Young |
| 4,645,450 A | 2/1987 | West |
| 4,648,551 A | 3/1987 | Thompson et al. |
| 4,651,068 A | 3/1987 | Meshkat-Razavi |
| 4,653,285 A | 3/1987 | Pohl |
| 4,656,553 A | 4/1987 | Brown |
| 4,661,756 A | 4/1987 | Murphy et al. |
| 4,663,725 A | 5/1987 | Truckenbrod et al. |
| 4,667,480 A | 5/1987 | Bessler |
| 4,667,874 A | 5/1987 | Johnson et al. |
| 4,669,040 A | 5/1987 | Pettit et al. |
| 4,670,696 A | 6/1987 | Byrne et al. |
| 4,674,291 A | 6/1987 | Kitauchi |
| 4,682,473 A | 7/1987 | Rogers, III |
| 4,688,547 A | 8/1987 | Ballard et al. |
| 4,699,570 A | 10/1987 | Bohn |
| 4,700,116 A | 10/1987 | Inoue et al. |
| 4,706,553 A | 11/1987 | Sharp et al. |
| 4,712,050 A | 12/1987 | Nagasawa et al. |
| 4,713,744 A | 12/1987 | Coston |
| 4,718,021 A | 1/1988 | Timblin |
| 4,722,018 A | 1/1988 | Pohl |
| 4,722,019 A | 1/1988 | Pohl |
| 4,727,320 A | 2/1988 | Brennan |
| 4,733,149 A | 3/1988 | Culberson |
| 4,736,143 A | 4/1988 | Nakamura et al. |
| 4,743,815 A | 5/1988 | Gee et al. |
| 4,749,881 A | 6/1988 | Uhrich |
| 4,754,405 A | 6/1988 | Foster |
| 4,765,150 A | 8/1988 | Persem |
| 4,773,311 A | 9/1988 | Sharp |
| 4,779,031 A | 10/1988 | Arends et al. |
| 4,794,537 A | 12/1988 | Adasek et al. |
| 4,795,088 A | 1/1989 | Kobayashi et al. |
| 4,800,804 A | 1/1989 | Symington |
| 4,803,848 A | 2/1989 | La Brecque |
| 4,806,833 A | 2/1989 | Young |
| 4,806,837 A | 2/1989 | Ito |
| 4,811,897 A | 3/1989 | Kobayashi et al. |
| 4,814,678 A | 3/1989 | Omae et al. |
| 4,829,447 A | 5/1989 | Parker et al. |
| 4,838,483 A | 6/1989 | Nurczyk et al. |
| 4,842,190 A | 6/1989 | Orchard |
| 4,843,084 A | 6/1989 | Parker et al. |
| 4,856,286 A | 8/1989 | Sulfstede et al. |
| 4,859,921 A | 8/1989 | Archer |
| 4,860,231 A | 8/1989 | Ballard et al. |
| 4,868,467 A | 9/1989 | Davis |
| 4,879,502 A | 11/1989 | Endo et al. |
| 4,881,472 A | 11/1989 | Stromberger et al. |
| 4,883,982 A | 11/1989 | Forbes et al. |
| 4,886,110 A | 12/1989 | Jackson |
| 4,896,828 A | 1/1990 | Peitz, Jr. |
| 4,902,952 A | 2/1990 | Lavery |
| 4,903,685 A | 2/1990 | Melink |
| 4,909,041 A | 3/1990 | Jones |
| 4,912,381 A | 3/1990 | Culberson |
| 4,920,948 A | 5/1990 | Koether et al. |
| 4,926,105 A | 5/1990 | Mischenko et al. |
| 4,931,948 A | 6/1990 | Parker et al. |
| 4,942,613 A | 7/1990 | Lynch |
| 4,942,921 A | 7/1990 | Haessig et al. |
| 4,943,760 A | 7/1990 | Byrne et al. |
| 4,949,021 A | 8/1990 | Rozman et al. |
| 4,950,918 A | 8/1990 | O'Breartuin et al. |
| 4,952,853 A | 8/1990 | Archer |
| 4,978,896 A | 12/1990 | Shah |
| 4,984,433 A | 1/1991 | Worthington |
| 4,992,715 A | 2/1991 | Nakamura et al. |
| 4,992,716 A | 2/1991 | Ellis |
| 5,005,365 A | 4/1991 | Lynch |
| 5,006,744 A | 4/1991 | Archer et al. |
| 5,013,981 A | 5/1991 | Rodi |
| 5,019,757 A | 5/1991 | Beifus |
| 5,023,527 A | 6/1991 | Erdman et al. |
| 5,025,248 A | 6/1991 | Bergeron |
| 5,027,049 A | 6/1991 | Pratt et al. |
| 5,027,789 A | 7/1991 | Lynch |
| 5,029,230 A | 7/1991 | Yamauchi |
| 5,033,000 A | 7/1991 | Littlejohn et al. |
| 5,038,088 A | 8/1991 | Arends et al. |
| 5,043,926 A | 8/1991 | Naka et al. |
| 5,065,813 A | 11/1991 | Berkeley et al. |
| 5,068,582 A | 11/1991 | Scott |
| 5,074,780 A | 12/1991 | Erdman |
| 5,075,608 A | 12/1991 | Erdman et al. |
| 5,076,076 A | 12/1991 | Payne |
| 5,088,645 A | 2/1992 | Bell |
| 5,089,754 A | 2/1992 | George |
| 5,089,759 A | 2/1992 | Miotke et al. |
| 5,090,303 A | 2/1992 | Ahmed |
| 5,092,227 A | 3/1992 | Ahmed et al. |
| 5,103,391 A | 4/1992 | Barrett |
| 5,104,037 A | 4/1992 | Karg et al. |
| 5,107,685 A | 4/1992 | Kobayashi |
| 5,115,728 A | 5/1992 | Ahmed et al. |
| 5,117,656 A | 6/1992 | Keck et al. |
| 5,119,071 A | 6/1992 | Takezawa et al. |
| 5,125,067 A | 6/1992 | Erdman |
| 5,135,045 A | 8/1992 | Moon |
| 5,146,147 A | 9/1992 | Wills et al. |
| 5,151,017 A | 9/1992 | Sears et al. |
| 5,159,218 A | 10/1992 | Murry et al. |
| 5,161,606 A | 11/1992 | Berkeley et al. |
| 5,166,592 A | 11/1992 | Bashark |
| 5,170,344 A | 12/1992 | Berton et al. |
| 5,173,651 A | 12/1992 | Buckley et al. |
| 5,179,524 A | 1/1993 | Parker et al. |
| 5,181,552 A | 1/1993 | Eiermann |
| 5,197,375 A | 3/1993 | Rosenbrock et al. |
| 5,197,667 A | 3/1993 | Bowsky et al. |
| 5,202,951 A | 4/1993 | Doyle |
| 5,203,179 A | 4/1993 | Powell |
| 5,211,331 A | 5/1993 | Seel |
| 5,211,332 A | 5/1993 | Adams |
| 5,227,704 A | 7/1993 | Erdman |
| 5,227,794 A | 7/1993 | Whikehart |
| 5,237,826 A | 8/1993 | Baldwin et al. |
| 5,244,146 A | 9/1993 | Jefferson et al. |
| 5,250,867 A | 10/1993 | Gizaw |
| 5,253,564 A | 10/1993 | Rosenbrock et al. |
| 5,269,660 A | 12/1993 | Pradelle |
| 5,276,630 A | 1/1994 | Baldwin et al. |
| 5,299,432 A | 4/1994 | Nakae et al. |
| 5,311,451 A | 5/1994 | Barrett |
| 5,327,036 A | 7/1994 | Carey |
| 5,331,619 A | 7/1994 | Barnum et al. |
| 5,334,923 A | 8/1994 | Lorenz et al. |

(56) References Cited

U.S. PATENT DOCUMENTS

| | | | |
|---|---|---|---|
| 5,364,026 | A | 11/1994 | Kundert |
| 5,367,239 | A | 11/1994 | Matsushita et al. |
| 5,376,866 | A | 12/1994 | Erdman |
| 5,390,206 | A | 2/1995 | Rein et al. |
| 5,397,970 | A | 3/1995 | Rowlette et al. |
| 5,410,230 | A | 4/1995 | Bessler et al. |
| 5,418,438 | A | 5/1995 | Hollenbeck |
| 5,440,218 | A | 8/1995 | Oldenkamp |
| RE35,124 | E | 12/1995 | Erdman et al. |
| 5,473,229 | A | 12/1995 | Archer et al. |
| 5,492,273 | A | 2/1996 | Shah |
| 5,497,039 | A | 3/1996 | Blaettner et al. |
| 5,513,058 | A | 4/1996 | Hollenbeck |
| 5,544,036 | A | 8/1996 | Brown, Jr. et al. |
| 5,557,182 | A | 9/1996 | Hollenbeck et al. |
| 5,559,407 | A | 9/1996 | Dudley et al. |
| 5,592,058 | A | 1/1997 | Archer et al. |
| 5,592,059 | A | 1/1997 | Archer et al. |
| 5,607,014 | A | 3/1997 | Van Ostrand et al. |
| 5,736,800 | A * | 4/1998 | Iannello et al. ............ 310/90.5 |
| 5,736,823 | A | 4/1998 | Nordby et al. |
| 5,777,409 | A | 7/1998 | Keck |
| 5,796,194 | A | 8/1998 | Archer et al. |
| 5,806,440 | A | 9/1998 | Rowlette et al. |
| 5,825,107 | A | 10/1998 | Johnson et al. |
| 5,859,519 | A | 1/1999 | Archer |
| 5,893,705 | A | 4/1999 | Khan et al. |
| 5,986,419 | A | 11/1999 | Archer et al. |
| 5,994,869 | A | 11/1999 | Becerra |
| 6,065,298 | A * | 5/2000 | Fujimoto ................. 62/230 |
| 6,104,113 | A | 8/2000 | Beifus |
| 6,132,182 | A | 10/2000 | Khan et al. |
| 6,147,465 | A | 11/2000 | Hollenbeck |
| 6,160,700 | A | 12/2000 | Wise et al. |
| 6,215,261 | B1 | 4/2001 | Becerra |
| 6,227,961 | B1 | 5/2001 | Moore et al. |
| 6,353,299 | B1 | 3/2002 | Ramachandran et al. |
| 6,356,044 | B1 | 3/2002 | Archer |
| 6,408,502 | B1 | 6/2002 | Brahmavar et al. |
| 6,423,118 | B1 | 7/2002 | Becerra et al. |
| 6,456,023 | B1 | 9/2002 | Becerra et al. |
| 6,457,653 | B1 | 10/2002 | Campbell |
| 6,494,681 | B2 | 12/2002 | Barry et al. |
| 6,504,338 | B1 | 1/2003 | Eichorn |
| 6,664,681 | B1 | 12/2003 | Ashe, Jr. et al. |
| 6,879,070 | B2 | 4/2005 | Leany et al. |
| 6,895,176 | B2 | 5/2005 | Archer et al. |
| 6,918,307 | B2 | 7/2005 | Ohlsson et al. |
| 6,964,174 | B2 | 11/2005 | Shah |
| 6,981,383 | B2 | 1/2006 | Shah et al. |
| 6,993,414 | B2 | 1/2006 | Shah |
| 7,017,827 | B2 | 3/2006 | Shah et al. |
| 7,039,300 | B2 | 5/2006 | Shah et al. |
| 7,077,708 | B1 | 7/2006 | Johnson et al. |
| 7,106,019 | B2 | 9/2006 | Becerra et al. |
| 7,145,302 | B2 | 12/2006 | Sanglikar et al. |
| 7,161,316 | B2 | 1/2007 | Archer et al. |
| 7,180,215 | B2 | 2/2007 | Archer et al. |
| 7,212,887 | B2 | 5/2007 | Shah et al |
| 7,598,628 | B2 | 10/2009 | Zver et al. |
| 7,784,296 | B2 | 8/2010 | Chen et al. |
| 2005/0278069 | A1 | 12/2005 | Bash et al. |
| 2005/0280384 | A1 | 12/2005 | Sulfstede |

FOREIGN PATENT DOCUMENTS

| | | |
|---|---|---|
| DE | 3541277 | 5/1987 |
| EP | 0086650 | 8/1983 |
| EP | 0198248 | 10/1986 |
| EP | 0264728 | 4/1988 |
| EP | 0296699 | 12/1988 |
| EP | 0401818 | 12/1990 |
| EP | 0572149 | 12/1993 |
| EP | 1914482 | 4/2008 |
| FR | 2561179 | 3/1984 |
| GB | 2079979 | 1/1982 |
| GB | 2202063 | 9/1988 |
| JP | 53-067921 | 6/1978 |
| JP | 56-060904 | 5/1981 |
| JP | 63-172302 | 7/1988 |
| JP | 63-220303 | 9/1988 |
| JP | 63-220304 | 9/1988 |
| JP | 1-023924 | 1/1989 |
| JP | 1-133102 | 5/1989 |
| JP | 64-005397 | 10/1989 |
| JP | 02-208440 | 8/1990 |
| JP | 3-049582 | 3/1991 |
| JP | 04-000286 | 1/1992 |
| JP | 05-118630 | 5/1993 |
| JP | 07-327397 | 12/1995 |
| JP | 2002-098088 | 4/2002 |
| JP | 2004-177063 | 6/2004 |
| KR | 10-1986-003879 | 2/1987 |
| KR | 10-1987-015301 | 8/1989 |
| KR | 10-1992-001878 | 2/1995 |
| WO | 85/00064 | 1/1985 |
| WO | 91/17491 | 11/1991 |
| WO | 92/00492 | 1/1992 |
| WO | WO03023284 | 3/2003 |

* cited by examiner

VENTILATION AIRFLOW RATE CONTROL

FIELD OF INVENTION

This invention relates to heating, ventilating, and air-conditioning (HVAC) equipment, systems and methods, and to control equipment, systems, and methods, and specific embodiments relate to mass-produced air conditioning units, for example, for residential applications, and to their controls.

BACKGROUND OF THE INVENTION

Heating, ventilating, and air-conditioning (HVAC) systems have been used to ventilate and maintain desirable temperatures within spaces such as buildings, and other at-least partially enclosed spaces have been equipped with ventilation systems including HVAC systems to provide comfortable and safe environments for occupants to live and work, for example. HVAC equipment and units such as air handlers, air conditioning units, heat pumps, furnaces, and the like have been mass produced in a variety of sizes and configurations, and appropriate sizes have been selected to be installed in various buildings having different or unique HVAC ductwork.

Many prior art HVAC units have had single speed blowers designed to provide adequate flow for typical ductwork. However, different buildings with different ductwork have had varying amounts of airflow restriction, and prior art HVAC units installed in such systems have often provided too much or too little flow in installations where the ductwork provided more or less airflow restriction than the HVAC designers had anticipated. In installations where airflow restriction significantly exceeded what the designers had anticipated, actual airflow rates have been insufficient, resulting in reduced energy efficiency as a result of reduced transfer of heat, inadequate heating or cooling of the space, higher utility bills than expected, frost formation on evaporator coils, or a combination thereof, as examples. On the other hand, in installations where airflow restriction has been significantly less than what the designers anticipated, HVAC units have produced more noise than desired, consumed more fan energy than necessary, provided excessive airflow to the space causing excessive air movement within the space, or a combination thereof, as further examples.

Further, certain HVAC units have been used that have had variable speed fans or blowers. Some such systems have been used in variable air volume (VAV) systems, for example, and have used variable speed drive units, such as variable frequency AC drive units and variable voltage DC systems. In some specialized installations, variable-speed fans have been used to compensate for variations in airflow restriction in HVAC ductwork. However, this has typically required the attention of skilled personnel who have measured airflow rates using handheld instruments such as Pitot tubes, measured airflow rates at registers, performed calculations, or a combination thereof, for example. In many installations, technicians of the necessary skill level are not available for this purpose or would add too much cost to the expense of installing and commissioning an HVAC unit. Further, prior art systems that provided for compensating for variations in airflow restriction within HVAC ductwork typically required specialized measurement equipment for measuring airflow rates directly, for example, which added cost and complexity to HVAC systems and, at least in some cases, reduced reliability of HVAC systems. Further, prior art systems did not operate continuously and therefore did not compensate for changes in airflow restriction that occurred after the system was commissioned, such as partial clogging of filters, user adjustment of registers, and modifications to the ductwork, as examples.

Accordingly, needs and potential for benefit exist for HVAC equipment, systems, and methods that provide for some degree of compensation for variations in ductwork restriction in different installations. In addition, needs and potential for benefit exist for such equipment, systems, and methods that at least partially compensate for changes in airflow restriction that occurred after the system was commissioned, such as partial clogging of filters, user adjustment of registers, and modifications to the ductwork, as examples. Further, needs and potential for benefit exist for such equipment, systems, and methods that are inexpensive, utilize existing components (e.g., to a greater degree), are reliable, and are easy to place into service by typical installation personnel. Further still, needs and potential for benefit exist for such equipment, systems, and methods that maintain (at least to some extent) cooling or heating effectiveness (or both) over a range of varying ductwork airflow restriction, that provide for reduced energy consumption, that provide for reduced noise, that avoid frost formation on evaporator coils, that avoid insufficient or excessive airflow rates, or a combination thereof, as examples. Needs and potential for benefit exist for such equipment, systems, and methods in typical residential applications, for example, such as mass-produced residential air-conditioning units, heat pumps, furnaces, and the like, that are suitable to be installed by typical installers of such equipment. Potential for improvement exists in these and other areas that may be apparent to a person of skill in the art having studied this document.

SUMMARY OF PARTICULAR EMBODIMENTS OF THE INVENTION

This invention provides, among other things, air handling units for ventilating an at-least partially enclosed space, air-conditioning units, methods of controlling an airflow rate within a ventilation system, and methods of providing more-constant performance of air conditioning units, as examples. Different embodiments adjust or vary speed or torque of a blower or fan motor based on inputs such as electric current of the motor or pressure (e.g., absolute or differential pressure) within the system, and speed or torque of the motor. Various embodiments of the invention provide as an object or benefit that they partially or fully address one or more of the needs, potential areas for improvement or benefit, or functions described herein, for instance. Specific embodiments provide as an object or benefit, for instance, that they at-least partially provide for control of airflow rates within ventilation systems, provide HVAC equipment, systems, and methods that provide for some degree of compensation for variations in ductwork restriction in different installations, or a combination thereof, for example.

Various embodiments provide equipment, systems, and methods that are reasonably inexpensive, utilize existing components to at least some degree, are reasonably reliable, and can reasonably be placed into service by typical installation personnel, for example, typical service personnel in residential installations. Further still, particular embodiments provide equipment, systems, and methods that maintain (at least to some extent) cooling or heating effectiveness (or both) over a range of varying ductwork airflow restriction, that provide for reduced energy consumption in comparison with certain alternatives, that provide for reduced noise, that avoid insufficient or excessive airflow rates, that provide for sufficient airflow through evaporator coils to prevent frost formation, that continuously compensate for variations in airflow restriction, or a combination thereof, as further examples.

Some specific embodiments provide such equipment, systems, and methods in residential applications, for example, such as residential air-conditioning units, heat pumps, furnaces, and the like, and many of these embodiments are suitable to be installed by typical installers of such equipment. Certain embodiments of the invention have as an object or benefit that they provide for control of airflow rate of fans having variable speed or torque motors using only one motor current sensor. In particular embodiments, such an object includes providing a substantially constant or constant airflow rate. Further, in some embodiments, an object or benefit is to improve or optimize airflow control performance with reduced or minimal computational resource requirements. Other objects and benefits of various embodiments of the invention may be apparent to a person of skill in the art having studied this document.

In specific embodiments, this invention provides air-handling units for ventilating an at-least partially enclosed space. In many such embodiments, the air-handling unit includes a first fan configured to blow air through the air-handling unit to the space, an electric first motor connected to and configured to turn the first fan, and a control system configured to use a first input and a second input to control and vary speed or torque of the first motor. In such embodiments, the first input is a representation of the speed or of the torque of the first motor, and the second input is a representation of an electric current of the first motor or of a pressure, for example, within the air-handling unit or ventilation system.

In some embodiments, the control system is configured to vary the speed or the torque of the first motor to obtain a substantially fixed airflow rate through the air-handling unit over a range of varying amount of airflow restriction, for example. In addition, some embodiments further include a first heat-transfer coil configured and positioned so that the air blown by the first fan through the air-handling unit passes through the first heat-transfer coil. In this example, a fluid passes through the first heat-transfer coil, and heat is transferred via the first heat-transfer coil between the air and the fluid. In a number of embodiments, the air-handling unit is an air conditioning unit, for example, the fluid is a refrigerant, and the first heat-transfer coil is an evaporator coil.

In particular embodiments, such an air-handling unit further includes, within an enclosure for the air-handling unit, an expansion valve, a compressor, an electric second motor connected to and configured to turn the compressor, a condenser coil, a second fan configured to blow air through the condenser coil, and an electric third motor connected to and configured to turn the second fan. Further, in certain embodiments, wherein the second input is the representation of the electric current of the first motor, the first motor has a first electrical power lead and a second electrical power lead, and the air-handling unit further includes a current sensor that includes a coil surrounding either the first electrical power lead or the second electrical power lead.

Other specific embodiments provide mass-produced air conditioning units for providing more-consistent airflow in a variety of residential structures having a variety of different ductwork configurations with different amounts of airflow restriction. Such air conditioning units include an evaporator, a first fan configured to blow or move air through the evaporator or air conditioning unit to the space, an electric first motor connected to and configured to turn the first fan, and a control system configured to use a first input and a second input to control and vary the speed or the torque of the first motor. In these embodiments, the control system is configured to repeatedly or continuously sample the first input and the second input and vary the speed or the torque of the first motor to obtain a substantially fixed airflow rate through the air conditioning unit or the evaporator over a range of varying amount of airflow restriction.

In some such embodiments, the first input is a representation of the speed or the torque of the first motor, and the second input is a representation of the electric current of the first motor or a pressure within the air conditioning unit. In particular embodiments, for example, the first input is a representation of the speed of the first motor, and the second input is a representation of the electric current of the first motor. In other embodiments, on the other hand, the first input is a representation of the torque of the first motor, and the second input is a representation of the electric current of the first motor.

In still other specific embodiments, this invention provides various methods, such as methods of controlling an airflow rate within a ventilation system. In an example of such a method, the method includes at least the steps of starting a fan motor within the ventilation system, operating the fan motor at a present input setting that includes a present motor speed setting or a present motor torque setting, and sampling a first representation of a first present parameter of the ventilation system that includes a present speed of the fan motor or a present torque of the fan motor. In this same example, before, during, or after the step of sampling the first representation, the method includes a step of sampling a second representation of a second present parameter of the ventilation system. In this embodiment, the second present parameter includes a present current of the fan motor or a present pressure within the ventilation system.

This example of a method further includes a step of calculating a third representation of a present airflow rate within the ventilation system using the first representation and the second representation, and a step of calculating a new input setting using the third representation of the present airflow rate and a fourth representation of a target airflow rate. In such an embodiment, the new input setting is predicted to provide a new airflow rate within the ventilation system that is closer to the target airflow rate than the present airflow rate. This example of a method also includes the steps of changing the present input setting to the new input setting, and repeating at least a plurality of times the steps of sampling the first representation, sampling the second representation, calculating the third representation of the present airflow rate, calculating the new input setting, and changing the present input setting to the new input setting.

In some embodiments, such a method further includes, for example, after the step of calculating the third representation, a step of evaluating whether the present airflow rate is within a range of the target airflow rate, and if the present airflow rate is not within the range of the target airflow rate, then the step of calculating the new input setting includes using a first formula to calculate the new input setting. On the other hand, if the present airflow rate is within the range of the target airflow rate, in this embodiment, then the step of calculating the new input setting includes using a second formula to calculate the new input setting. In this example, the first formula converges on the target airflow rate more quickly than the second formula, for example.

In addition, in particular embodiments, for at least an initial present input setting, the step of sampling the first representation of the first present parameter includes sampling the second representation at least a plurality of times and evaluating stabilization of the second present parameter. In such embodiments, for example, the third representation (which is used to calculate the new input setting, to which the present input setting is changed) is calculated using samples of the second representation taken after the second present parameter has substantially stabilized. Furthermore, in some methods, for instance, the present input setting is initially selected to provide a predicted airflow rate within the ventilation system that is less than the target airflow rate, and the new input setting is selected to provide a new airflow rate that is less than the target airflow rate, to avoid overshooting the target airflow rate. And in some embodiments of methods, the target airflow rate is fixed at a constant value.

Another example of an embodiment is a method of providing more-consistent performance of air conditioning units that are mass produced and installed in a variety of structures having a variety of different ductwork configurations with different amounts of airflow restriction. In this example, the method includes at least a step of obtaining or providing at least a plurality air conditioning units, each air conditioning unit having a cooling coil, a fan configured to blow air through the cooling coil and to the structure, and an electric fan motor connected to and configured to turn the fan. In addition, this example includes (in any order with the previously identified step) a step of obtaining or providing a control system configured use the method described above to control the fan motor to at least partially compensate for the different amounts of the airflow restriction of the different ductwork configurations.

In some such embodiments, each of the plurality of air conditioning units further includes an expansion valve, a compressor, a compressor motor connected to and configured to turn the compressor, a condenser coil, a condenser fan configured to blow air through the condenser, and a condenser fan motor connected to and configured to turn the condenser fan. In many such embodiments, the cooling coil is an evaporator coil, and the present input setting is initially selected to provide a predicted airflow rate within the ventilation system that is less than the target airflow rate. Further, in some embodiments, the new input setting is selected to provide a new airflow rate that is less than the target airflow rate, to avoid overshooting the target airflow rate. Moreover, various embodiments further include a step of providing an alarm that the airflow restriction of the ductwork is excessive, for example, if the third representation of the present airflow rate fails to reach a predetermined value.

Various embodiments of the invention are contemplated wherein the first present parameter is the present speed of the fan motor, the first present parameter is the present torque of the fan motor, the second present parameter is the present current of the fan motor, the second present parameter is the present pressure within the ventilation system, or a combination thereof, for example. Various combinations provide significant advantages in particular situations. Further, some embodiments of these methods may also include other steps described herein. Other embodiments of the invention include various combinations of the features and limitations described herein or known to people of skill in the art of HVAC systems and equipment design, and controls for such systems and equipment.

Figure 1:
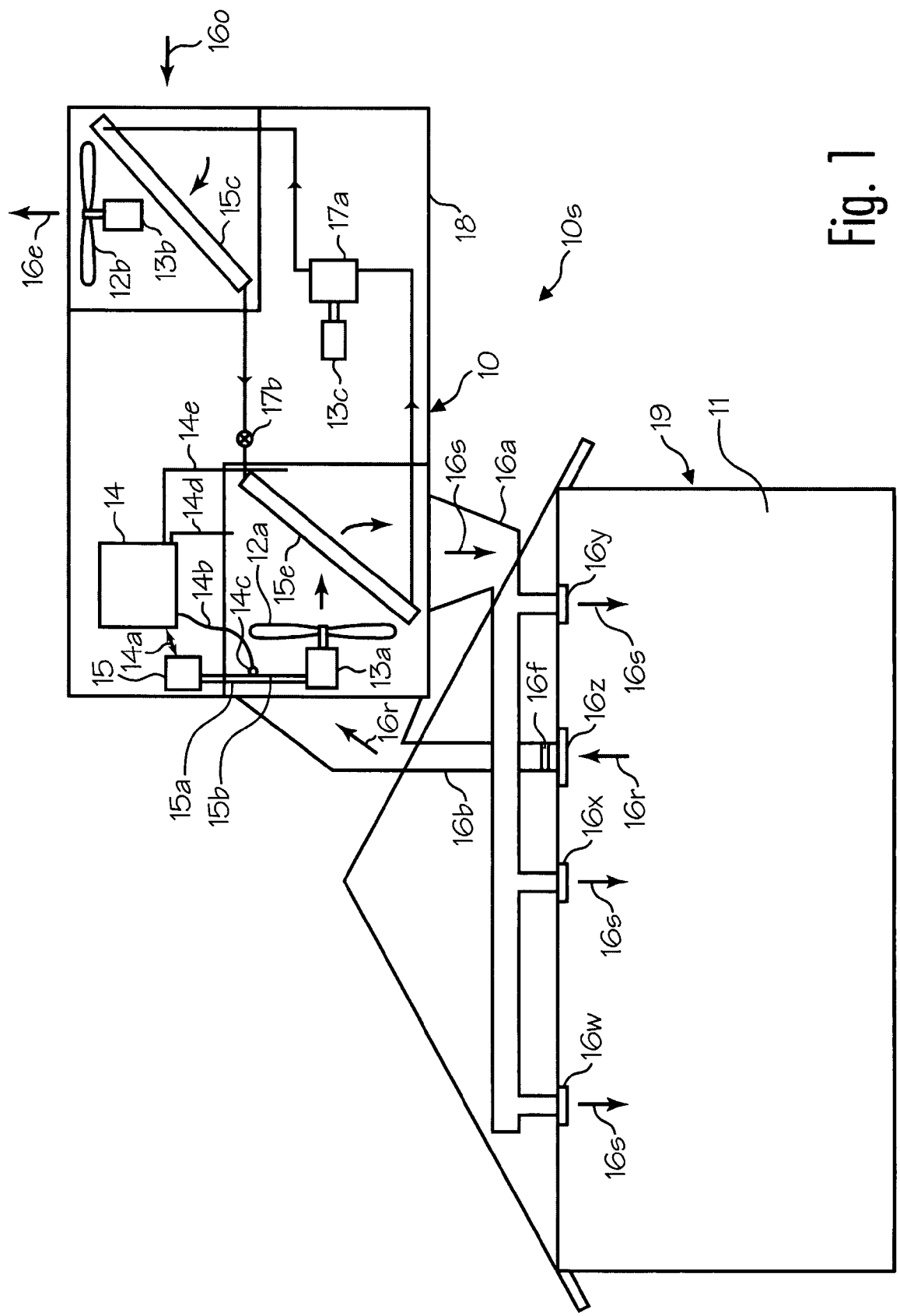
FIG. 1 is a block diagram illustrating, among other things, an air-handling unit that is also an air conditioning unit, and a ventilation system, that illustrates various examples of embodiments of the invention.

The drawings illustrate, among other things, various particular examples of embodiments of the invention, and certain examples of characteristics thereof. Different embodiments of the invention include various combinations of elements or steps shown in the drawings, described herein, known in the art, or a combination thereof.

DETAILED DESCRIPTION OF EXAMPLES OF EMBODIMENTS

In a number of embodiments, this invention provides improvements to heating, ventilating, and air-conditioning (HVAC) systems, methods, and controls. Various embodiments control airflow rates based on certain input parameters, and several embodiments use two particular input parameters. In some embodiments, airflow rates are controlled using motor speed and motor electric current, for example. In other embodiments, airflow rates are controlled using motor torque and motor electric current, as another example. In many embodiments, the system or method of the invention includes a target airflow rate, and the system or method measures the motor electric current and determines the speed or torque at which the motor should run, as an example. Further, in some embodiments, the system or method converts a speed- or torque-based motor blower assembly into a constant airflow rate device independent of duct system design. And in certain embodiments, a pressure may be used as an input instead of motor electric current.

In a number of embodiments, airflow rate may be varied to at least partially compensate for differing airflow restriction in ductwork, for example. And in some embodiments, air handlers such as air conditioning units may be mass produced in common configurations and installed in different buildings or structures with different ductwork configurations having different amounts of airflow restriction. In such applications, airflow rates from the air handlers may be controlled to at least partially compensate for the different amounts of airflow restriction of the different ductwork configurations. In particular embodiments, for example, the speed, torque, or both, of a fan motor may be varied to obtain a substantially constant or fixed airflow rate over a range of varying amounts of airflow restriction. Such a process may be automated, continuous, or both, in various embodiments.

FIG. 1 illustrates an example of an embodiment wherein air-handling unit 10 is used for ventilating an at-least partially enclosed space 11. In this embodiment, space 11 is enclosed by or within building or structure 19, which may be a residence such as a single family house, an apartment, a portion of a duplex, triplex, or fourplex, or a cabin, or may be a hotel room, a business establishment such as a store or a restaurant, or the like. In many embodiments, residential use is the predominant market for air handling unit 10, for instance. In this embodiment, air-handling unit 10 includes a first fan 12a that is configured to move or blow air through air-handling unit 10 and to space 11. In this embodiment, supply air 16s is delivered to space 11 through ductwork 16a and registers 16w, 16x, and 16y. Further, in this embodiment, return air 16r is fed to air-handling unit 10 through return air ductwork 16b, filter 16f, and grille 16z, as may be found in a residential application, for example. In other embodiments, fan 12a may be fed with outside air, or a combination of outside and return air, for example. As would be apparent to a person of ordinary skill in the art, air handling unit 10 and structure 19 are not shown to scale relative to each other in FIG. 1, and other components illustrated may also not be shown to scale. Fan 12a, in different embodiments, may be an axial or propeller-type fan (as shown), a centrifugal fan [e.g., with forward curved (a squirrel cage fan) or backward curved vanes (e.g., airfoil shaped)], or a mixed flow fan, as examples.

In the embodiment illustrated, air-handling unit 10, ductwork 16a and 16b, registers 16w, 16x, and 16y, filter 16f, and grille 16z, form ventilation system 10s. In this embodiment, within air-handling unit 10, electric first motor 13a is connected to and configured to turn first fan 12a. As used herein, "connected to and configured to turn" includes through a common rotating shaft (as illustrated), directly coupled, through a belt drive (e.g., which may have an adjustable sheave or pulley), or integral (e.g., an integral fan and motor), for example. In this example of an embodiment, motor 13a is driven or powered by drive unit 15 through leads 15a and 15b. Drive unit 15 may be an electronic control module, for example. In some embodiments, motor 13a is an alternating current (AC) motor, and drive unit 15 is a variable frequency drive unit, for example. In such embodiments, motor 13a may be a two-phase motor and may have two leads 15a and 15b (as shown) or may have three or more phases and a corresponding number of leads, in other embodiments, as other examples. In AC embodiments, drive unit 15 may be configured to produce a varying frequency AC power supply to motor 13a through leads 15a and 15b to control the speed of motor 13a and fan 12a, for instance. In other embodiments, motor 13a may be a direct current (DC) motor and drive unit 15 may be a DC power supply, which may be configured to produce a varying DC output voltage to motor 13a through leads 15a and 15b to control the torque to, and therefore the speed of, motor 13a and fan 12a, for example. In still other embodiments, drive unit 15 may be a variable frequency AC power supply, but may provide for control of torque. In still other embodiments, drive unit 15 may be a DC power supply, but may provide for control of speed. Although shown in FIG. 1 as a separate components, in some embodiments, drive unit 15 may be integral with motor 13a.

Still referring to FIG. 1, drive unit 15, and thereby motor 13a and fan 12a, may be controlled by control system or controller 14. In this embodiment, drive unit 15 and controller 14 are shown as separate devices; however, in other embodiments, drive unit 15 and controller 14 may be integral, controller 14 may be part of drive unit 15, or drive unit 15 may be part of controller 14, as examples. Controller 14 may include, or consist of, in some embodiments, an electronic board dedicated for this purpose or combined with one or more other electronic boards such as a furnace, air handler, or thermostat board, as examples. In this embodiment, controller 14 is shown to be within enclosure 18 of air-handling unit 10, but in other embodiments, controller 14 may be located elsewhere, for example, within structure 19, or within space 11. And in some embodiments, controller 14 may be combined with or integral to a thermostat or user-accessible control panel, for example. Further, in some embodiments, controller 14 may be digital, and may include a digital processor, software, storage, memory, etc. Still further, in some embodiments, a user interface may be provided which may include a keypad, a display, or the like. Such a user interface may be part of controller 14 or may be a separate component, in various embodiments.

In a number of embodiments, controller 14 may output instructions to drive unit 15. In some embodiments, controller 14 outputs instructions to other components of air-handling unit 10 as well, or may have other outputs, in addition to those described herein. Output instructions from controller 14 to drive unit 15 may be transmitted through data link 14a, for instance, and may include, for example, input settings, which may include instructions for drive unit 15 to operate motor 13a at a particular speed or torque, for example. In some embodiments, controller 14 may instruct drive unit 15 to operate motor 13a at a particular AC frequency or at a particular DC voltage, as other examples. In some embodiments, such outputs (e.g., from controller 14) may also serve as inputs or representations of parameters, for example, to control the same or other outputs, for example, speed or torque (e.g., of motor 13a). Data link 14a (or other data links described herein) may include one or more conductors, which may communicate digital or analogue signals, for example. These conductors may be insulated, shielded or both. In other embodiments, data link 14a may include a wireless connection, communication over power conductors, communication through a network, or the like.

In a number of embodiments, controller 14 may also input data, measurements, or instructions from sensors or other devices and may use such inputs to calculate, select, or determine output instructions, such as input settings for drive unit 15, for example. In some embodiments, controller or control system 14 is configured to use a first input and a second input to control and vary speed or torque of the first motor 13a, for example. In such embodiments, the first input may be, for example, a representation of the speed or the torque of the first motor, which may be an input to controller 14 through data link 14a, for example. In other embodiments, speed or torque may be an output from controller 14, and thus may already be known by (and available as an input to) controller 14. As used herein, an "input" includes a value that is already known, is generated internally, or is also an output. An input may be a present or temporary value, in many embodiments, and may be an instantaneous value, or an average of several instantaneous values, for example.

In the case of a representation of the speed, for instance, in a variable-frequency AC drive system, such an input or representation may be a speed in revolutions per minute (rpm), a voltage, current, or digital value that is proportional to the rotational speed, or another value that is representative of the speed of motor 13a or at which drive unit 15 is driving motor 13a. In the case of a representation of the torque, for example, in a variable-voltage DC drive system, such an input or representation may be a drive voltage of motor 13a or across leads 15a and 15b, a voltage, current, or digital value that is proportional to the torque or drive voltage of motor 13a or across leads 15a and 15b, or another value that is representative of the torque of motor 13a or at which drive unit 15 is driving motor 13a, as examples. In other embodiments, the first input, second input, or both, may be inputs from sensors, such as those described herein.

In some embodiments, the second input (e.g., to controller 14) is a representation of an electric current of the first motor 13a, or a pressure, for example. In embodiments where the second input (e.g., to controller 14) is a representation of the electric current of the first motor 13a, a sensor, such as current sensor or current meter 14c may be used, for example, to detect or measure the current being supplied to or used by motor 13a. In different embodiments, current sensor 14c may be a direct or an indirect current sensor or meter. In some embodiments, a low-resistance resistor may be placed within the first electrical power lead 15a or the second electrical power lead 15b, and current may be sensed or measured by measuring the voltage across this resistor. Further, in some AC embodiments, current sensor 14c may include an electrical coil surrounding either the first electrical power lead 15a or the second electrical power lead 15b (shown), and current through the electrical power lead may be sensed or measured by measuring the electrical current in the coil of current sensor 14c (or the voltage across a resistor through which such current flows) that is induced by the AC current through the first electrical power lead 15a or the second electrical power lead 15b. In this embodiment, data link 14b may communicate the signal from current sensor 14c (or the representation of the electric current of motor 13a) to controller 14. In a number of embodiments, the invention, or incorporation of the invention into an air handling or air conditioning unit, requires only one new or additional sensor, which may be current sensor 14c, for example. Further, in the embodiment illustrated, current sensor 14c is located in between drive unit 15 and motor 31a. But in other embodiments, current sensor 14c may measure current into drive unit 15, as another example. In other embodiments, a measure of current may be an output from drive unit 15 or motor 13a, as other examples.

In some other embodiments, an input to controller 14 is a pressure within ventilation system 10c, for example. Such a pressure may be an absolute, gauge, or differential pressure, for instance. As used herein, unless clearly otherwise, a "pressure" may be an absolute pressure, a gauge pressure, or a differential pressure, for example, and may be measured within the HVAC system or ductwork, for instance. A pressure or differential pressure may be measured with an instrument such as a pressure probe (or multiple pressure probes), which may convert the pressure to an electrical signal, for example. In various embodiments of air-handling unit 10, for instance, pressure may be measured at pressure tap 14d, pressure tap 14e, or a differential pressure between pressure taps 14d and 14e may be used, or the differential pressure across heat-transfer coil or evaporator 15e.

In some embodiments, the control system or controller 14 (e.g., through drive unit 15) is configured to vary the speed or the torque of the first motor 13a to obtain a substantially fixed airflow rate (e.g., of supply air 16s, return air 16r, or both) through air-handling unit 10 over a range of varying amount of airflow restriction, for example, within supply ductwork 16a, registers 16w, 16x, and 16y, grille 16z, filter 16f, return ductwork 16b, or a combination thereof. As used herein, a substantially fixed airflow rate varies within no more than 5 percent from a maximum to a minimum. Also as used herein, a fixed airflow rate varies within no more than 1 percent from a maximum to a minimum. Further, as used herein, this fixed or substantially fixed airflow rate refers to the airflow rate after stable conditions have been reached. Airflow restriction from all of these components (supply ductwork 16a, registers 16w, 16x, and 16y, grille 16z, filter 16f, and return ductwork 16b, in this example) may contribute to an overall airflow restriction. This overall airflow restriction may be referred to as the ductwork airflow restriction, for instance, and may be unknown or assumed by the designers of the air-handling unit 10. In an example of an embodiment, a substantially fixed airflow rate is obtained over a range from 0.18 to 0.7 inches of water (i.e. water column or WC) of varying amount of airflow restriction. Further, in this example, the ventilation system reaches the substantially fixed airflow rate within 30 to 60 seconds, depending on the amount of airflow restriction within this range.

In some embodiments, including the embodiment illustrated in FIG. 1, air-handling unit 10 is an air conditioning unit having evaporator 15e. In such embodiments, providing a substantially fixed airflow rate (e.g., of supply air 16s, return air 16r, or both) may facilitate the avoidance of ice or frost forming on evaporator 15e, for example, in installations where the airflow restriction in the ductwork exceeds what the designers of air-handling unit 10 anticipated. Specifically, in embodiments wherein compressor 17a operates at a fixed speed and capacity, having a constant airflow rate through evaporator 15e facilitates maintenance of the temperature of evaporator 15e just above a freezing temperature. The temperature of evaporator 15e may be maintained within a range of 35 to 40 degrees, 33 to 35 degrees, 34 to 38 degrees, 32 to 33 degrees (all in Fahrenheit) or the like, as examples. Having a fixed airflow rate may also avoid excessive noise generated at registers 16w, 16x, and 16y in installations wherein the airflow restriction of the ductwork is substantially less than what was anticipated by the designers of air-handling unit 10. In other embodiments, airflow rates may vary, for example, to obtain a desired temperature of evaporator 15e to avoid freezing, as cooling or heating needs of space 11 change, to minimize energy consumption between fan and compressor loads, to control humidity, to avoid resonance, as set by a user, or the like.

Evaporator 15e is an example of a first heat-transfer coil configured and positioned so that the air (e.g., return air 16r) blown by first fan 12a through air-handling unit 10 passes through the first heat-transfer coil (e.g., 15e) (e.g., becoming supply air 16s). In this example, wherein the first heat-transfer coil is an evaporator (15e), a fluid (e.g., a refrigerant, such as Freon) passes through the first heat-transfer coil, and heat is transferred via the first heat-transfer coil between the air and the fluid. Thus, in a number of embodiments, air-handling unit 10 is an air conditioning unit, the fluid (e.g., that passes through the first heat-transfer coil) is a refrigerant, and the first heat-transfer coil is an evaporator coil (e.g., 15e). In other embodiments, chilled water (e.g., cooled by a chiller) or heated water (e.g., heated with electric heat, by burning a fuel such as natural gas, propane, heating oil, wood, biomass, hydrogen, or coal, produced by solar energy, from a geothermal source, produced as waste heat from an industrial process, produced as heat from cogeneration, or produced as waste heat from chillers or air conditioning units), or steam (e.g., produced similarly or in a boiler) are other examples of fluids that may pass through the first heat-transfer coil (e.g., 15e) in various alternate embodiments.

In the embodiment illustrated, air-handling unit 10 further includes, within enclosure 18 for air-handling unit 10, expansion valve 17b, compressor 17a, electric second motor 13c connected to and configured to turn compressor 17a, condenser coil 15c, second fan 12b configured to blow air (e.g., outside air 16o, which becomes exhaust air 16e) through condenser coil 15c, and electric third motor 13b connected to and configured to turn second fan 12b. In other embodiments, many components may be located in a separate enclosure. For example, in some embodiments, components analogous to expansion valve 17b, compressor 17a, electric second motor 13c connected to and configured to turn compressor 17a, condenser coil 15c, second fan 12b configured to blow air (e.g., outside air 16o, which becomes exhaust air 16e) through condenser coil 15c, and electric third motor 13b connected to and configured to turn second fan 12b may be located in one or more enclosures outside of structure 19. In such embodiments, components analogous to evaporator 15e, blower or fan 12a, and motor 13a, (or a number of sets of such components) may be located inside structure 19, for example.

In some embodiments, controller 14 may be used to control multiple motor blower assemblies (e.g., motor 13a and fan 12a being one example). In some embodiments dip switches, jumpers, or both, may be mounted on the board, for example, to select the desired assembly. In certain embodiments, communication between the control circuit (e.g., of controller 14) and the motor (e.g., 13a being an example) may be used to detect the assemblies.

Certain examples of embodiments of the invention include mass-produced air conditioning units (e.g., air conditioning unit embodiments of air-handling unit 10) for providing more-consistent airflow (e.g., supply air 16s, return air 16r, or both) in a variety of residential structures (e.g., an example of which is structure 19) having a variety of different ductwork (e.g., 16a, 16b, or both) configurations with different amounts of airflow restriction. Such air conditioning units may include evaporator 15e, first fan 12a configured to blow air through the air conditioning unit (e.g., through unit 10, evaporator 15e, or both) to space 11, electric first motor 13a connected to and configured to turn first fan 12a, and control system 14 configured to use a first input and a second input (e.g., via data links 14a, 14b, 14d, 14e, or a combination thereof) to control and vary the speed or the torque of first motor 13a. In these embodiments, control system 14 may be configured to repeatedly or continuously (or both) sample the first input and the second input and vary the speed or the torque (or both, e.g., power) of first motor 13a to obtain a substantially fixed airflow rate (e.g., of supply air 16s, return air 16r, or both) through evaporator 15e or through air conditioning unit 10 over a range of varying amount of airflow restriction (e.g., in ductwork 16a, 16b, or the like).

Different inputs may be used in different embodiments, and various examples are described herein. In some such embodiments, the first input is a representation of the speed or the torque of the first motor, and the second input is a representation of the electric current of the first motor or a pressure within the air conditioning unit, for example. Further, in particular embodiments, the first input is a representation of the speed of the first motor, and the second input is a representation of the electric current of the first motor. In other embodiments, on the other hand, the first input is a representation of the torque of the first motor, and the second input is a representation of the electric current of the first motor.

Figure 2:
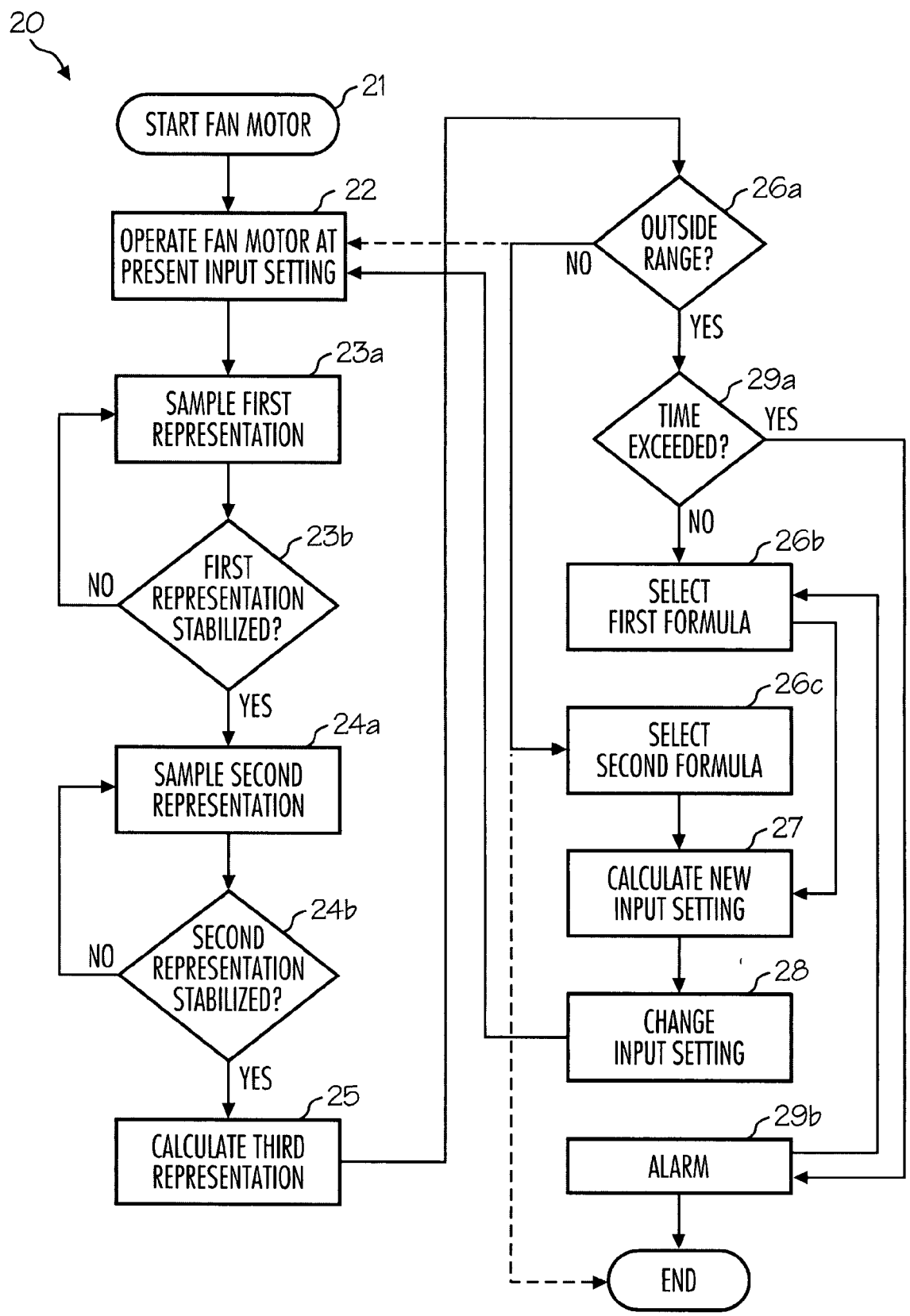
FIG. 2 is a flow chart illustrating examples of various methods, including, as examples, methods of controlling a fan in a ventilation system, methods of controlling an airflow rate within a ventilation system, and methods of providing more-constant performance of air conditioning units that are mass produced for installation in a variety of structures having a variety of different ductwork configurations with different amounts of airflow restriction.
Figure 6:
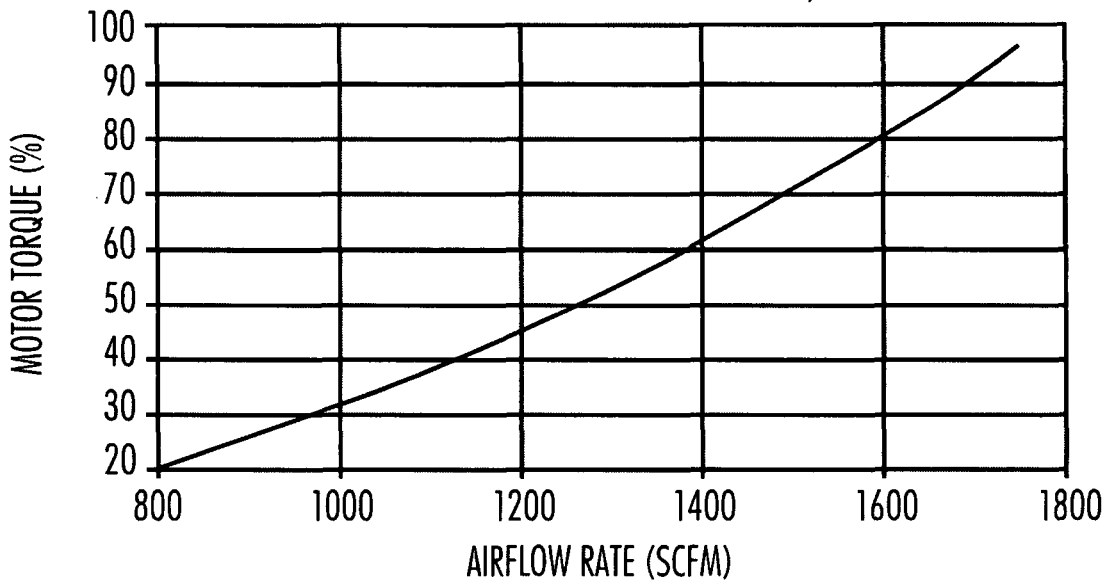
FIG. 6 is a graph illustrating an example of a relationship between airflow rate and motor torque, for an example of a ventilation system.
Figure 7:
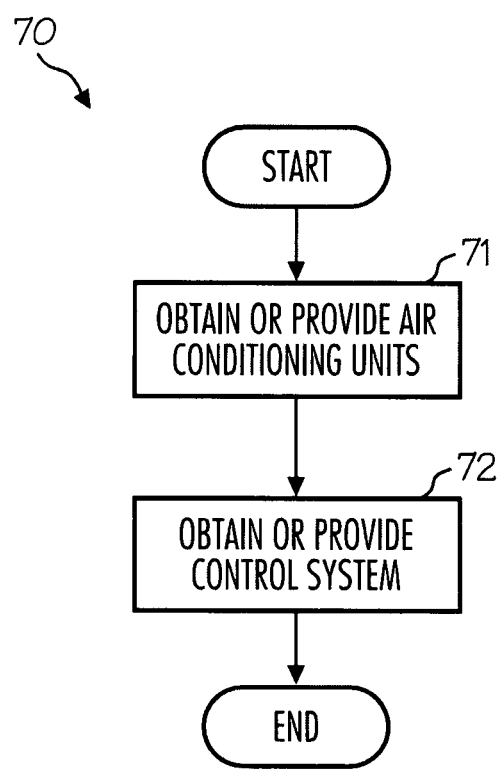
FIG. 7 is a flow chart illustrating examples of various methods, including, among other things, methods of providing more-constant performance of air conditioning units that are mass produced for installation in a variety of structures having a variety of different ductwork configurations with different amounts of airflow restriction.

FIGS. 2 and 7 illustrate a couple of examples of methods that are in accordance with certain embodiments of the invention. In FIG. 2, method 20 is an example of a method of controlling an airflow rate within a ventilation system, for instance. An example of such a ventilation system is ventilation system 10s shown in FIG. 1, and described above and herein. Method 20 may be performed by air-handling unit 10, ventilation system 10s, or specifically by controller 14, as examples. In such examples, the airflow rate that is controlled may be the airflow rate of supply air 16s, return air 16r, or both, for example. In many embodiments, method 20 is automated, is computer controlled, or both. In many embodiments, method 20 is repeated a number of times, is continuous, or both. And in some embodiments of method 20, the target airflow rate is fixed at a constant value, for example, 1500 SCFM in the embodiment illustrated in FIGS. 5 and 6. It should be noted that in embodiments wherein the target airflow rate is fixed, the present or actual airflow rate may vary, to some extent, and the system (e.g., controller 14) may make adjustments in an effort to reach the target airflow rate or a range measured therefrom, for example.

The example of method 20 includes a step of starting a fan motor (step 21), for example, a fan motor within the ventilation system. An example of such a fan motor is fan motor 13a shown in FIG. 1 within ventilation system 10s. Method 20 also includes, in this embodiment, a step of operating the fan motor at a present input setting (step 22). In many such embodiments, the present input setting (e.g., of step 22) includes (or is) a present motor speed setting or a present motor torque setting, as examples. For example, in an embodiment of ventilation system 10s shown in FIG. 1 wherein drive unit 15 is a variable-frequency AC power supply, the present input setting (e.g., of step 22) may be a frequency or corresponding speed of motor 13a or fan 12a, for instance. As another example, in an embodiment of ventilation system 10s shown in FIG. 1 wherein drive unit 15 is a variable-voltage DC power supply, the present input setting (e.g., of step 22) may be a voltage or corresponding torque of motor 13a or fan 12a, for instance. In other embodiments, the present input setting may include a combination of speed and torque, may be a power setting (e.g., power produced by drive unit 15 or consumed by motor 13a), or the like.

As described herein, the present input setting, may start out at an initial value, and may change through a number of iterations, for example, of method 20. In some embodiments, the present input setting may converge over time on a steady state value. As used herein, a "present" setting, parameter, or the like, may be an instantaneous value, or may be taken over a short period of time, but will not necessarily be the same over a longer period of time. For example, present input settings, parameters, or the like, may change for subsequent iterations of method 20 (e.g., from step 22 through step 28). However, in many embodiments, present settings, parameters, or the like, may stabilize over time, for example, reaching or approaching a steady state, at which time the present settings, parameters, or the like, may not change significantly or at all for subsequent iterations of method 20 (e.g., from step 22 through step 28). In some embodiments, the step of operating the fan motor at a present input setting (step 22) may be maintained for a particular period of time, for example, until one or more subsequent steps is or are performed. For example, in some embodiments, the step of operating the fan motor at a present input setting (step 22) may be maintained for 1 to 5 seconds or for a certain number of iterations or cycle counts (e.g., five iterations of steps 22 to 28). Such a delay may be, for instance, to wait for conditions to stabilize.

The example of method 20, as shown, further includes a step of sampling a first representation (step 23a). This first representation may be, for example, of a first present parameter of the ventilation system. Further, in some embodiments, the first present parameter includes (or is) a present speed of the fan motor (e.g., motor 13a) or a present torque of the fan motor (e.g., motor 13a). As used herein, a "representation" of a parameter may be (includes) the actual value of the parameter (e.g., with particular units), a value that is proportional to the parameter, or another value that is used to represent or substitute for the parameter. A representation may be expressed, for example, as a digital number, an analogue value (e.g., a current, voltage, or capacitance), or the like. In addition, in different embodiments, the present speed may be an actual speed, or may be an assumed, approximate, or fictitious speed. For example, in some embodiments, the present speed may be a speed output, may be based on the frequency of AC power (e.g., from drive unit 15), or the like. Similarly, in different embodiments, the present torque may be an actual torque, or may be an assumed, approximate, or fictitious torque. For example, in some embodiments, the present torque may be a torque output, may be based on the voltage of DC power (e.g., from drive unit 15), or the like.

In some embodiments, the step of sampling the first representation (step 23a) may include reading a sensor or receiving a signal from a sensor. Such a sensor may be a speed sensor, (e.g., a tachometer), a frequency meter, a torque meter (e.g., a load sensor or strain gage) or a voltage meter, as examples. In other embodiments, the step of sampling the first representation (step 23a) (as used herein) may be accomplished internally, for example, within controller 14. In some such embodiments, the step of sampling the first representation (step 23a) (as used herein) may include reading or accessing a speed, torque, frequency, voltage, or representation thereof, for instance, which may be an actual, present, instantaneous, average, assumed, or instructed value, for example. Further, in some embodiments, (as used herein) the step of sampling the first representation (step 23a) may include accessing or using a setting, such as a present input setting, which may be a temporary setting, and may be stored, for example, within controller 14. Thus, in a number of embodiments, a sensor is not used for the step of sampling the first representation (step 23a). In many embodiments, actual speed, torque, frequency, or voltage, for example, is assumed to be the present setting or input of that value (e.g., at least after stabilization has occurred).

In this same example shown in FIG. 2, method 20 also includes a step of sampling a second representation (step 24a). This second representation may be of a second present parameter of the ventilation system, and the second present parameter may be or include a present current of the fan motor or a present pressure within the ventilation system, as examples. For instance, the present current of motor 13a may be measured with current meter 14c as described above and herein. In different embodiments, the step of sampling a second representation (step 24a), may be performed before, during, or after the step of sampling the first representation (step 23a). In addition, the steps of sampling the first representation (step 23a) and sampling the second representation (step 24a) may be performed during or after the step of operating the fan motor at the present input setting (step 22). Further, some embodiments may sample more than just two representations.

In the embodiment illustrated, method 20 further includes a step of calculating a third representation (step 25). Such a third representation may be a representation of a present airflow rate (e.g., the airflow rate of supply air 16s, return air 16r, or both, as shown in FIG. 1) within the ventilation system (e.g., 10s), for example, and may be calculated using the first representation (e.g., from step 23a) and the second representation (e.g., from step 24a), for example. For instance, in some embodiments, the third representation (e.g., of step 25) may be a numerical value of the actual or present airflow rate within the ventilation system (e.g., 10s), while in other embodiments, the third representation (e.g., of step 25) may be proportional to the actual or present airflow rate within the ventilation system, or may be another representation of the actual or present airflow rate within the ventilation system.

In this same embodiment, method 20 also includes a step of calculating a new input setting (step 27). Such a new input setting may be calculated (step 27), for example, using the third representation (e.g., from step 25), for instance, of the present airflow rate. This calculation (step 27) may also use a fourth representation, which may include (or be) a target airflow rate. In many embodiments, the new input setting is predicted to provide a new airflow rate within the ventilation system (e.g., 10s) that is closer to the target airflow rate than the present airflow rate, for instance. This example of method 20 also includes a step of changing the present input setting (step 28), for example, to the new input setting (e.g., calculated in step 27). Many embodiments also include repeating, at least a plurality of times, the steps of sampling the first representation (step 23a), sampling the second representation (step 24a), calculating the third representation (step 25), for example, of the present airflow rate, calculating the new input setting (step 27), and changing the present input setting (step 28) to the new input setting. This process may include a number of iterations, and in some embodiments, the process of repeating steps may continue indefinitely. In some embodiments, this process may be performed continuously, for example, repeating some or all of steps 22 to 28 as fan 12a or air handler 10 operates, at least for a particular cycle.

In many embodiments, the actual airflow rate (e.g., the airflow rate of supply air 16s, return air 16r, or both, as shown in FIG. 1) gradually approaches or converges on the target airflow rate, for example, independent of airflow restriction within the ductwork or system. Further, if airflow restriction within ventilation system 10s changes, for example, as filter 16f accumulates dust particles, or as users open, close, or adjust registers 16w, 16x, 16y, or a combination thereof, in many embodiments, the airflow rate continues to approach or seek the target airflow rate, in a number of embodiments, at least partially compensating for such changes, or maintaining a substantially constant airflow rate, or an airflow rate that is substantially equal to the target airflow rate, within ventilation system 10s as such conditions change.

In particular embodiments of the invention, and as illustrated by method 20 in FIG. 2, the step of sampling the first representation (step 23a), for example, of the first present parameter, may include sampling the first representation (step 23a) at least a plurality of times (e.g., in a plurality of cycles or iterations), and may include, or be accompanied by, a step of evaluating stabilization (step 23b), for instance, of the first present parameter or of the first representation. In addition, in some embodiments, the step of sampling the second representation (step 24a), for example, of the second present parameter, may include sampling the second representation at least a plurality of times and, may include, or be accompanied by, a step of evaluating stabilization (step 24b) of the second present parameter or of the second representation, as examples. In such embodiments, for example, the third representation (e.g., calculated in step 25), which is used to calculate the new input setting (e.g., in step 27), to which the present input setting is changed (e.g., in step 28), may be calculated using samples of the first representation (e.g., from step 23a), of the second representation (e.g., from step 24a), or both, taken after the first present parameter, the second present parameter, or both (or the first representation, the second representation, or both) have substantially stabilized.

In some embodiments, the first or second parameters (or both) are considered to have stabilized when they change by no more than a particular amount or a particular percentage, for example, within a particular time or number of iterations. If the parameter or parameters (or representations thereof) are not stabilized, then the representations continue to be sampled, in many embodiments, until such stabilization occurs, or in some embodiments, until a particular amount of time has passed. In addition, although FIG. 2 shows the second representation as not being sampled until the first representation has stabilized, in other embodiments, this order may be reversed, or the sampling of the first representation and the second representation may be concurrent. Further, in some embodiments, it may be necessary or desirable only to check for stabilization for one of the first and the second representations (or parameters). In some embodiments, after one of the first and the second representations (or parameters) has stabilized, it may be assumed that the other one of the first and the second representations (or parameters) has also stabilized.

Further, in some embodiments, the first representation, second representation, or both (e.g., sampled in steps 23a and 24a), may be analyzed for stabilization (e.g., in steps 23b and 24b) only for an initial present input setting. In other words, only for the first iteration of operating the fan motor at the present input setting (step 22) [e.g., immediately after starting the fan motor (step 21)]. Thus, in various embodiments, for at least an initial present input setting (e.g., at which fan motor 13a is operated in the initial iteration of step 22), the step of sampling the second representation of the second present parameter (step 24a) includes sampling the second representation at least a plurality of times and evaluating stabilization of the second present parameter (e.g., in step 24b).

For example, in some embodiments, in an initial iteration, stabilization of motor current is verified, and once motor current is stabilized, the other parameter or parameters (e.g., speed, torque, etc.), or representation thereof, are also assumed to be stable, for example at the present input setting. Further, in some embodiments, the step of operating the fan motor at the present input settings (step 22), or the steps of sampling the first representation (step 23a), sampling the second representation (step 24a), or both, may be performed for a predetermined or calculated period of time (or number of iterations) that is long enough to warrant an assumption that the first and the second representations (or parameters) have stabilized. In particular embodiments, after the initial iteration, or after the present input setting is first changed (e.g., in step 28) the first representation, second representation, or both, is (or are) sampled only once (e.g., in step 23a, 24a, or both) and is (or are) assumed to be stable. In some embodiments, even if this assumption that stabilization has occurred is not completely accurate, the error will not prevent the system or method from approaching or reaching the target airflow rate in a satisfactory manner.

In a particular embodiment, the fan motor is operated at the present input setting for a particular minimum time (e.g., in the first iteration of step 22), for example, 5 seconds. After this minimum time is passed, motor current is sampled (e.g., step 24a) in this embodiment, for five iterations. In this example, iterations last about two seconds [e.g., motor current is sampled (step 24a) every two seconds]. Samplings from these five iterations are then averaged in this embodiment. In this embodiment, for each iteration, a running average of the present iteration and the previous four iterations is calculated. Next in this embodiment, motor current is sampled (step 24a) again, and a new running average is calculated and compared with the first average. In this embodiment, if the average motor current samplings has not changed by more than 0.1 amps, then steady state conditions are assumed to have been reached, and the latest average is used for calculating the third representation (step 25).

In some embodiments, the last five values of motor speed are also averaged for calculating the third representation (step 25). In other embodiments, just one value for speed (or torque) is used, for example, the latest value. For other motors, other current values may be used besides 0.1 amps, such as 0.01, 0.05, 0.2 or 0.4 amps, or ½ to 5 percent of the rated amperage of the motor, for example. In addition, the 5 seconds, 5 iterations, two seconds, etc., may vary, depending on the characteristics of the motor, fan, drive unit, controller, current meter, and other equipment. Further, in some embodiments, torque may be sampled instead of speed, pressure may be sampled instead of current, or both. Furthermore, in this embodiment, after a certain amount of time is passed, steady state conditions are assumed to have been reached, and the last 5 (for example) readings are used (or the most recent reading) for calculating the third representation (step 25), even if motor current samplings have continued to change by more than 0.1 amps, for example.

Further, in some embodiments, method 20 further includes, after the step of calculating the third representation (step 25), a step of evaluating whether the present airflow rate is within a (first) range of the target airflow rate (step 26a). In some such embodiments, if the present airflow rate is not within the range of the target airflow rate, then the step of calculating the new input setting (step 27) includes using a first formula to calculate the new input setting (e.g., in step 27). In this embodiment of method 20, this includes the step of selecting the first formula (step 26b), if the third representation or the present airflow rate is not within the range. On the other hand, in this embodiment, if the present airflow rate is within the range of the target airflow rate, then the step of calculating the new input setting (step 27) includes using a second formula to calculate the new input setting (e.g., in step 27). In method 20, this includes the step of selecting the second formula (step 26c), if the third representation or the present airflow rate is within the range (e.g., of step 26a).

In this example, the first formula may converge on the target airflow rate more quickly than the second formula. In other words, the first formula, in this embodiment, is a course formula or is used in a course control mode, and the second formula is a fine or cruise control formula or is used in a fine control or cruise control mode. Thus, the airflow rate may change relatively quickly to the edge of the range, and then may change more gradually as the target airflow rate is approached, in some embodiments. In other embodiments, a single formula or routine may be used which may change the airflow in greater increments initially and then may converge on the target airflow rate more slowly (e.g., asymptotically) as the target airflow rate is approached. Other embodiments may use three or more formulas. Still other embodiments may converge slowly throughout the process, which may have the advantage of making the change in airflow rate less noticeable by occupants of structure 19, for example.

Further, in some embodiments, if the present airflow rate is within the range (e.g., in step 26a) or another smaller range, then the fan motor continues to operate at the present input setting (e.g., step 22 is implemented), and the input setting is not changed (e.g., steps 27, 28, or both, are not performed). Even further, in some embodiments, as another example, once the present airflow rate is first found to be within the range (e.g., in step 26a), the evaluation of whether the present airflow rate is within the range (e.g., in step 26a) may not be repeated for each iteration, and it may be assumed that the present airflow rate is within the range, and the second formula may be used from that point forward, for a certain number of iterations, for a certain period of time, until the fan motor is turned off, until the fan motor is cycled off by an automatic control or thermostat, or the like.

Figure 3:
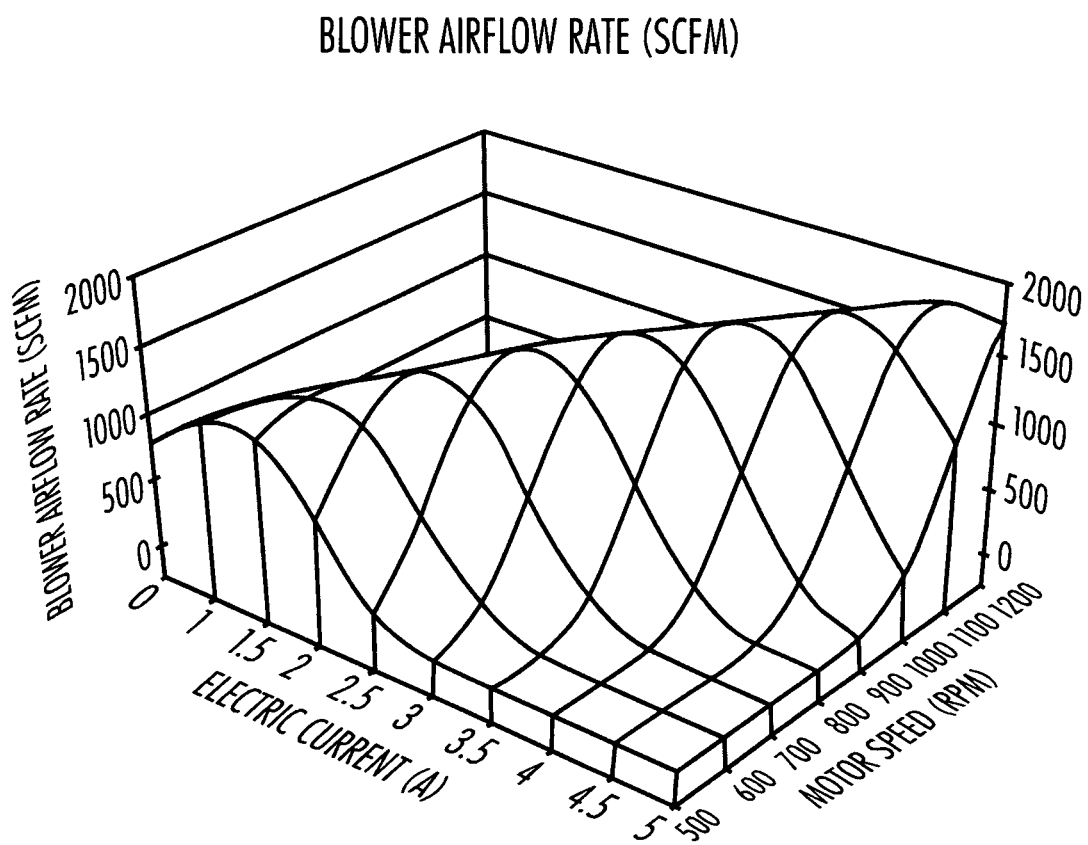
FIG. 3 is a graph illustrating an example of a relationship between airflow rate, motor speed, and motor electric current for an example of an embodiment of the invention wherein motor speed and motor current are used as inputs or parameters to control airflow rate.

In many embodiments, information that is used to calculate the third representation (step 25), to produce (or that us used in) the formulas (e.g., selected in steps 26b or 26c), to calculate the new input setting (step 27), or a combination thereof, may be obtained by measuring the characteristics of the motor (e.g., 13a) and blower or fan (e.g., 12a) in a laboratory environment, for example, via a wind tunnel test. In some embodiments, a plot is created, either graphically or in the form of a look-up table, for example, that expresses or embodies relationships between blower or fan (e.g., 12a) airflow rate [e.g., in standard cubic feet per minute (SCFM)] and electric current, motor speed (i.e., of motor 13a), or both (e.g., a three dimensional graph or table). FIG. 3 is an example of a three-dimensional plot of airflow rate, electric current, and motor speed, for an example of a fan and motor assembly. And FIG. 4 is an example of a three-dimensional plot of airflow rate, electric current, and motor torque, for an example of a fan and motor assembly.

In one example, the motor (e.g., 13a) and fan (e.g., 12a) assembly is installed in a wind tunnel, the motor (e.g., 13a) is operated at a fixed speed, and the wind tunnel motor speed is adjusted to obtain data at different motor (e.g., 13a) currents. The motor (e.g., 13a) speed is then changed and this process is repeated. In another example, fixed torques are used instead of fixed speeds. In some embodiments where torque is sampled and controlled, motors or fans (or combinations thereof) may be avoided that have the same motor current at more than one torque or airflow rate within conditions corresponding to the anticipated range of varying amount of airflow restriction.

Figure 4:
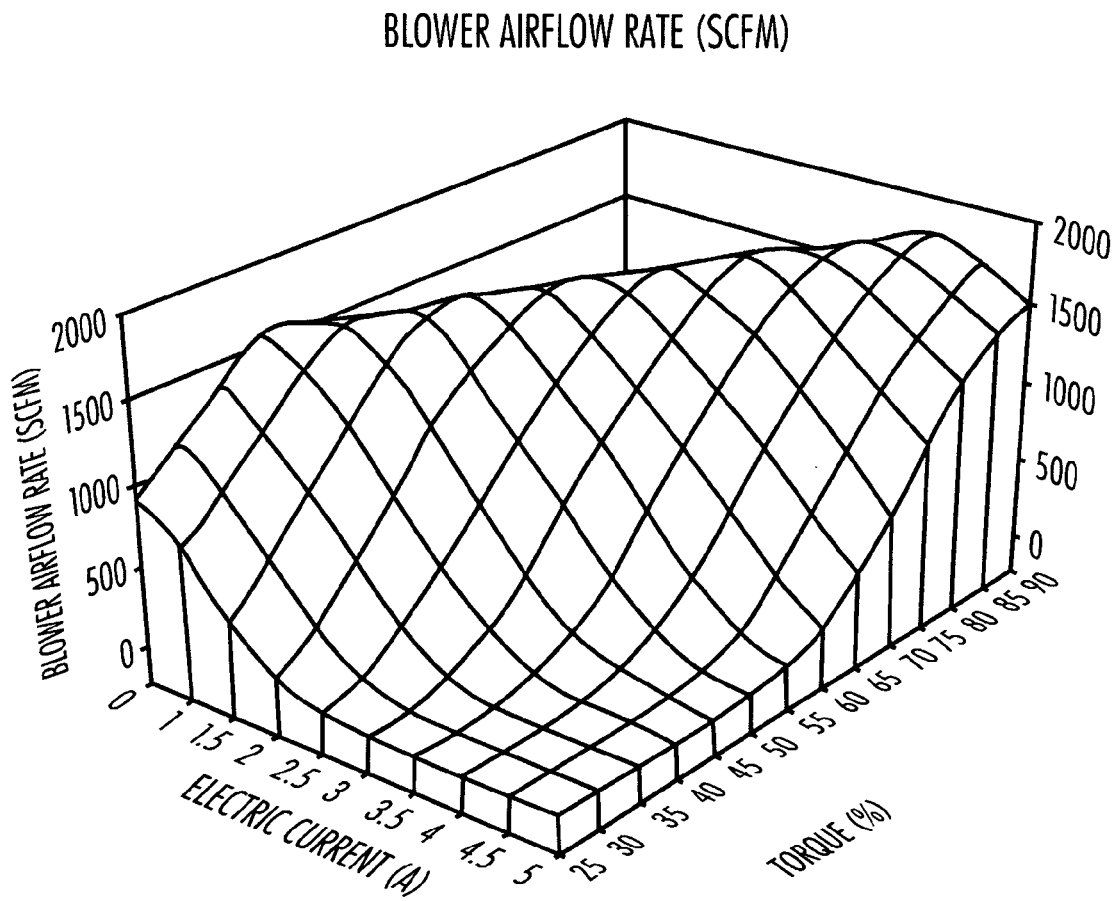
FIG. 4 is a graph illustrating an example of a relationship between airflow rate, motor torque, and motor electric current for an example of an embodiment of the invention wherein motor torque and motor current are used as inputs or parameters to control airflow rate.

It should be noted that the actual operating range of the motor (e.g., 13a) in field conditions or corresponding to the anticipated range of varying amount of airflow restriction, may only occupy a small portion of FIG. 3 or FIG. 4. Also, in different embodiments, other factors, such as voltage, power factor, etc., may be taken into consideration as well (e.g., measured, plotted, included in lookup tables, etc.), or may be assumed to be constant. In different embodiments, just the motor, just the fan, or both, may be tested, and measurements taken. In embodiments where both the motor and fan are tested, they may be tested separately, or together (e.g., as a unit), in various embodiments.

Figure 5:
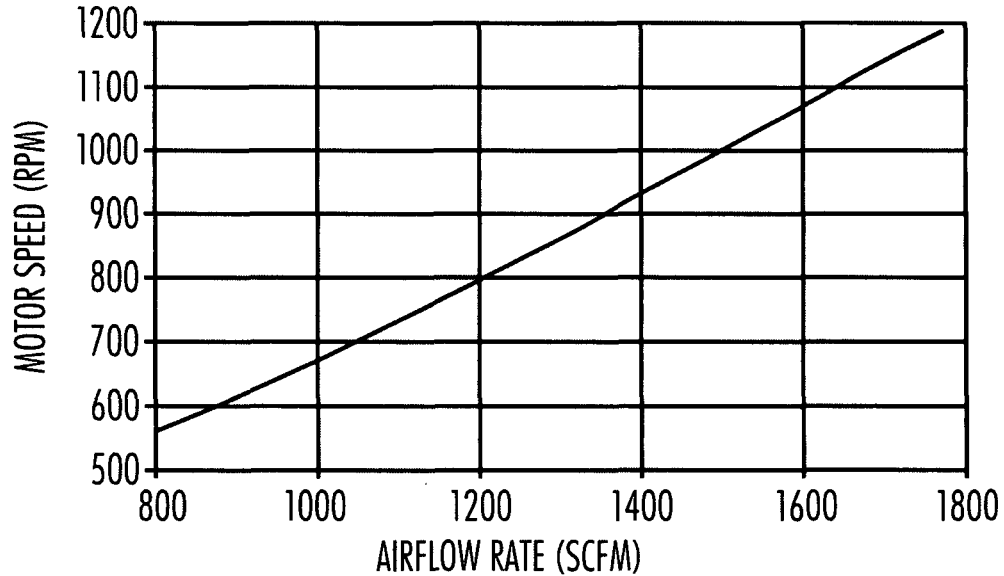
FIG. 5 is a graph illustrating an example of a relationship between airflow rate and motor speed, for an example of a ventilation system.

FIG. 5 shows an example of measured motor speed versus airflow rate for an example of a ventilation system where the static pressure satisfies the equation: Blower Outlet Static Pressure=$0.55*(SCFM/1500)^2$ (inches of water). In this equation, 1500 represents the nominal design airflow rate (e.g., of supply air 16s, return air 16r, or both, shown in FIG. 1) and 0.55 represents the design static pressure (in inches of water) of the ventilation system at 1500 SCFM. In this embodiment, FIG. 5 illustrates the motor speed that will achieve the target airflow rate in a duct system (which, for example, may include airflow restriction from the duct(s), heat exchanger coil, filter, etc.) that yields 0.55 inches of water pressure drop between the blower outlet and air handler (or furnace, etc.) inlet at 1500 SCFM.

Similarly, FIG. 6 shows an example of measured motor torque versus airflow rate where the static pressure satisfies the equation: Blower outlet static pressure=$0.55*(SCFM/1500)^2$ (inches of water). Again, in this equation, 1500 represents the nominal design airflow rate (e.g., of supply air 16s, return air 16r, or both, shown in FIG. 1) and 0.55 represents the design static pressure at 1500 SCFM (standard cubic feet per minute). In this embodiment, FIG. 6 shows the motor torque to achieve the target airflow rate in a duct system that yields 0.55 inches of water pressure drop between the blower outlet and air handler (or furnace, etc.) inlet at 1500 SCFM. FIGS. 5 and 6 represent or describe an example of a nominal or anticipated ventilation system.

Returning to FIG. 2, in some embodiments of method 20, for instance, the present input setting is initially selected (e.g., when or after the fan motor is first started in step 21) to provide a predicted airflow rate within the ventilation system that is less than the target airflow rate. This prediction may be based on an amount of airflow restriction that is expected, nominal, or average, as examples. In a particular embodiment, the prediction is based on a system that provides 0.55 inches of water of airflow restriction at a nominal (or target) flow rate of 1500 SCFM (e.g., as shown in FIGS. 5 and 6). As an example, in some embodiments, the present input setting is initially selected (e.g., after the fan motor is first started in step 21) to provide a predicted airflow rate within the ventilation system that is about 70 percent of the target airflow rate. In other embodiments, a different percentage may be used, such as 25, 40, 50, 60, 65, 75, 80, 85, or 90 percent of the target airflow rate, as examples.

As another example, in some embodiments, the present input setting is initially selected (e.g., when or after the fan motor is first started in step 21) to be about 70 percent of the input setting that would be predicted to provide an airflow rate within the ventilation system that is equal to the target airflow rate. In other embodiments, a different percentage may be used, such as 25, 40, 50, 60, 65, 75, 80, 85, or 90 percent of the input setting that would be predicted to provide an airflow rate within the ventilation system that is equal to the target airflow rate, as examples). In various embodiments, such an input setting may be speed, torque, or a representation thereof, for example. In yet another example, the target airflow rate is initially reduced for the first iteration, and then is gradually increased to the desired airflow rate. Such a reduced initial airflow rate may be 25, 40, 50, 60, 65, 70 75, 80, 85, or 90 percent of the desired target airflow rate, for example.

In some variable speed embodiments, for example, the first speed signal that controller 14, for example, sends to drive unit 15 or to motor 13a, is calculated by multiplying the target speed by a ratio R, where R is between 0.4 and 0.8 (e.g., 0.7). Similarly, some variable torque drive embodiments, for example, the first torque signal that controller 14, for example, sends to drive unit 15 or to motor 13a, is calculated by multiplying the target torque by the ratio R, which may have the same or a similar value as for a variable speed embodiment. In such embodiments, the target speed or torque is the speed or torque at which the target airflow rate would be predicted to occur in a nominal ventilation system (i.e., a system in which the nominal airflow restriction would be encountered at the nominal design airflow rate). In the example illustrated in FIGS. 5 and 6, the target speed and target torque can be obtained from the target airflow rate (e.g., 1500 SCFM). Selecting a value for R that is less than 1 may insure that if the actual duct system is bigger or less restrictive than nominal, that the actual airflow rate will not exceed the target airflow rate, at least in most situations, or at least not by very much. In some embodiments, the control circuit (e.g., controller 14) controls the acceleration of motor 13a, in which case the R value can be even lower, and the procedure can be repeated more times before the target airflow rate is reached or approached.

In addition, in some such embodiments, the new input setting (e.g., calculated in step 27) may be calculated or selected to provide a new airflow rate that is less than the target airflow rate, for example, to avoid overshooting the target airflow rate. In an example of an embodiment wherein the speed of the fan or motor is the first parameter or the first representation (e.g., of step 23*a*), the target airflow rate is used to calculate or select a target speed, for example, using FIG. 5, data analogous thereto, or an analogous formula. In this example, the sample or samples of the first representation (e.g., from step 23*a*) is (or are) used to calculate or select the present speed, for example, also using FIG. 5, data analogous thereto, or an analogous formula.

From these speeds, a preliminary new speed is determined or calculated, in this example, where the preliminary new speed is equal to the speed of the present input setting (e.g., of step 22) times the target speed [e.g., the speed at which the target airflow rate would be predicted to occur in a nominal ventilation system (i.e., a system in which the nominal airflow restriction would be encountered at the nominal design airflow rate)], divided by the speed at which the present motor current would be predicted to occur in a nominal system. This is an example of the first formula (e.g., of step 26*b*) described herein, for instance, which may include the value of T described below. In this formula, for example, the speed at which the present motor current would be predicted to occur in a nominal system, may be based on the data in FIG. 3, which may be stored (e.g., in controller 14) in the form of a look-up table. Linear or higher level interpolation may be used between data points stored in such a look-up table, for instance.

In some such embodiments, the new speed is calculated from the preliminary new speed by subtracting a value of T from the preliminary new speed. The presence of T, in this embodiment, is to avoid speed overshoot, and T is positive if the preliminary new speed is greater than the present speed (e.g., from step 22), and negative if the preliminary new speed is less than the present speed (e.g., from step 22). In some embodiments, the value of T is 1 to 5 percent of the maximum speed (e.g., the maximum speed permitted for motor 13*a*, drive unit 15, or both). For example, in different embodiments, T may be 0.01, 0.02, 0.03, 0.04, or 0.05 times the maximum speed. In other embodiments, T may be such a coefficient, or another coefficient, times the nominal speed, times the preliminary speed, times the target speed, or the like.

In other embodiments, other values may be subtracted from or multiplied by (or added or divided) the preliminary new speed to arrive at the new speed, such that the new speed is less than the preliminary new speed to avoid or reduce the risk of speed or airflow rate overshoot. In many embodiments, the new speed is calculated, selected, predicted, or determined to provide a new airflow rate that is closer to the target airflow rate than the present airflow rate. In particular embodiments, at least when the present airflow rate is less than the target airflow rate, the new speed is also calculated, selected, predicted, or determined to provide a new airflow rate that is less than the target airflow rate to avoid airflow rate overshoot.

In an example of an embodiment wherein the torque of the fan or motor is the first parameter or first representation (e.g., of step 23*a*), the target airflow rate is used to calculate or select a target torque, for example, using FIG. 6, data analogous thereto, or an analogous formula. In this example, the sample or samples of the first representation (e.g., from step 23*a*) is used to calculate or select the present torque, for example, also using FIG. 6, data analogous thereto, or an analogous formula. From these torques, a preliminary new torque may be determined or calculated, for example, where the preliminary new torque is equal to the torque of the present input setting (e.g., of step 22) times the target torque [e.g., the torque at which the target airflow rate would be predicted to occur in a nominal ventilation system (i.e., a system in which the nominal airflow restriction would be encountered at the nominal design airflow rate)], divided by the torque at which the present motor current would be predicted to occur in a nominal system. This is another example of the first formula (e.g., of step 26*b*) described herein, for instance, which may also include the value of T described below. In this formula, for example, the torque at which the present motor current would be predicted to occur in a nominal system, may be based on the data in FIG. 4, which may be stored (e.g., in controller 14) in the form of a look-up table. Similar to the example above, linear or higher level interpolation may be used between data points stored in the look-up table, for instance.

In some such embodiments, the new torque is calculated from the preliminary new torque by subtracting a value of T from the preliminary new torque. The presence of T, in this embodiment, is also to avoid torque overshoot, and T is positive if the preliminary new torque is greater than the present torque (e.g., from step 22), and negative if the preliminary new torque is less than the present torque (e.g., from step 22). In some embodiments, the value of T is 1 to 5 percent of the maximum torque (e.g., the maximum torque permitted for motor 13*a*, drive unit 15, or both). For example, in different embodiments, T may be 0.01, 0.02, 0.03, 0.04, or 0.05 times the maximum torque. In other embodiments, T may be such a coefficient times the nominal torque, times the preliminary torque, times the target torque, or the like.

In other embodiments, other values may be subtracted from or multiplied by the preliminary new torque to arrive at the new torque, such that the new torque is less than the preliminary new torque to avoid torque overshoot or airflow rate overshoot. In many embodiments, the new torque is calculated, selected, predicted, or determined to provide a new airflow rate that is closer to the target airflow rate than the present airflow rate. In particular embodiments, at least when the present airflow rate is less than the target airflow rate, the new torque is also calculated, selected, predicted, or determined to provide a new airflow rate that is less than the target airflow rate to avoid airflow rate overshoot.

In some embodiments, the range (e.g., of step 26*a*) extends from 3 to 10 percent below the third representation (e.g., calculated in step 25) or target airflow rate (e.g., 1500 SCFM in certain examples described herein), to this same amount above the third representation or target airflow rate, for example. In particular embodiments, the range (e.g., of step 26*a*) extends from 5 percent below the target airflow rate to 5 percent above the target airflow rate, for example. In this example of method 20, once the present airflow rate [e.g., for which a (third) representation is calculated in step 25] is within the range (e.g., of step 26*a*), for example, within 5 percent of the target airflow rate, the control circuit (e.g., controller 14) enters the cruise control mode (e.g., of step 26*c*).

In particular embodiments wherein the first representation (e.g., from step 23*a*) is speed, in the cruise control mode, the new input setting (e.g., calculated in step 27) or new input speed, is the old or present speed (e.g., the present input setting of step 22) plus a constant times the quantity of the target airflow rate (e.g., of step 27) minus the present airflow rate, that quantity times the maximum motor speed divided by the target airflow rate. This is an example of the second formula (e.g., of step 26*c*). In this example, the present airflow rate may be determined using the first representation (e.g., from step 23*a*), the second representation (e.g., from step 24a), and the data represented by FIG. 3, for example (e.g., in the form of a look-up table). Further, in this embodiment, the constant may be between 0.015 and 3.0 for example. Certain examples of the constant include 0.05, 0.1, 0.2, 0.5, and 1.0. This constant may be selected so that the speed adjustment in the cruise control mode is as fast as possible while avoiding speed overshoot, for instance. In this example, when the present airflow rate (e.g., calculated using the first representation from step 23a, the second representation from step 24a, and the data in FIG. 3) is equal to the target airflow rate (e.g., of step 27), the new input setting (e.g., new speed) is equal to the present input setting (e.g., present speed). Accordingly, no adjustment in speed is made under such circumstances in this embodiment.

In particular embodiments wherein the first representation (e.g., from step 23a) is torque, in the cruise control mode, the new input setting (e.g., calculated in step 27) or new input torque, is the old or present torque (e.g., the present input setting of step 22) plus a constant times the quantity of the target airflow rate (e.g., of step 27) minus the present airflow rate, that quantity times the maximum motor torque divided by the target airflow rate. This is another example of the second formula (e.g., of step 26c). In this example, the present airflow rate may be determined using the first representation (e.g., from step 23a), the second representation (e.g., from step 24a), and the data represented by FIG. 4, for example (e.g., in the form of a look-up table). Further, in this embodiment, the constant may also be between 0.015 and 3, for example. Certain examples of the constant include 0.05, 0.1, 0.2, 0.5, and 1.0. This constant may be selected so that the torque adjustment in the cruise control mode is as great as possible while avoiding torque overshoot, for instance. In this example, when the present airflow rate (e.g., calculated using the first representation from step 23a, the second representation from step 24a, and the data in FIG. 3) is equal to the target airflow rate (e.g., of step 27), the new input setting (e.g., new torque) is equal to the present input setting (e.g., present torque). Accordingly, no adjustment in torque is made in this situation.

In some embodiments, if the present airflow rate (e.g., calculated using the first representation from step 23a, the second representation from step 24a, and the data in FIG. 3 or 4) is within a second range, then the new input setting (e.g., new speed or torque) is set equal to the present input setting (e.g., present speed or torque). This second range may be smaller than the (first) range of step 26a, for example. For instance, the second range may extend from 1 or 2 percent below the target airflow rate to an equal amount above the target airflow rate, for example. This second range may help to avoid unnecessary adjustments close to the target airflow rate. In other embodiments, such small adjustments may continue for a particular time, at periodic intervals, at a reduced or continually reducing rate of frequency, or indefinitely, as examples. Further, in various embodiments, during the cruise control mode, if the third representation (e.g., present airflow rate) is found to be outside of the range (of step 26a) [e.g., due to a change in the target airflow rate, opening or closing of a register (e.g., 16w, 16x, or 16y), or the like] then method 20 returns to the course control mode (e.g., step 26b) in this embodiment.

In a number of embodiments, if the new input setting (e.g., calculated in step 27) is greater than a maximum, then the new input setting is set to the maximum. For example, in some embodiments where the input setting is speed, if the new speed is greater than the maximum speed, then the maximum speed is used. For another example, in some embodiments where the input setting is motor torque, if the new torque is greater than the maximum motor torque, then the maximum motor torque is used. In addition, in particular embodiments, if the new input setting (e.g., calculated in step 27) is less than a minimum, then the new input setting is set to zero, in some embodiments, or to the minimum in other embodiments. For example, in some embodiments where the input setting is speed, if the new speed is less than the minimum speed, then the speed is set to zero, or minimum speed is used, which may on which embodiment is implemented, or may be user selectable, for instance. For another example, in some embodiments where the input setting is motor torque, if the new torque is less than the minimum torque, then the torque is set to zero, or minimum torque is used, which may on which embodiment is implemented, or may be user selectable, as another example.

Furthermore, in certain embodiments, if the first representation (e.g., from step 23a), the second representation (e.g., from step 24a), both, or a value calculated or determined therefrom, is found to be outside of a predetermined range, then an alarm may be provided. For example, if motor current (e.g., measured with current sensor 14c) is found to exceed the current rating of the motor (e.g., 13a) then a warning light may be illuminated or a warning message may be provided. In some embodiments, ventilation system 10, motor 13a, or both, my be stopped, or the speed of motor 13a may be reduced, if motor current (e.g., measured with current sensor 14c) is found to exceed the current rating of the motor (e.g., 13a). In some embodiments, an audible alarm may be used.

Moreover, various embodiments of method 20 further include the step of providing an alarm (step 29b), for example, that the airflow restriction of the ductwork is excessive. Such an alarm may be provided (step 29b), for example, if the third representation (e.g., calculated in step 25) of the present airflow rate fails to reach a predetermined value. For example, an alarm may be provided (step 29b), for example, if the present airflow rate is not within the (first) range (e.g., of step 26a) of the target airflow rate, and a predetermined time limit has been exceeded (step 29a). Method 20 illustrates an example of such an embodiment. In other embodiments, a different range or threshold may be used (e.g., besides the range of step 26a) or a number of iterations (e.g., of step 28) may be counted before an alarm is provided (e.g., rather than measuring time). In still other embodiments, an alarm may be provided (e.g., analogous to step 29b) whenever the airflow rate is outside of a range (e.g., of step 26a or another range), for instance, until the airflow rate approaches the target airflow rate enough to be within the range. In some embodiments, an alarm may be provided (step 29b), for example, if the third representation (e.g., calculated in step 25) of the present airflow rate fails to reach the target airflow rate, for example, within a predetermined time or predetermined number of iterations. Or in some embodiments, the alarm may be provided (step 29b), for example, whenever the third representation (e.g., calculated in step 25) of the present airflow rate differs from the target airflow rate, for example, at all, or by a predetermined offset.

Such an alarm (e.g., provided in step 29b), or other alarms, may be in the form of a visual alarm (e.g., a light, LED, displayed message) or an audible alarm (e.g., a buzzer, bell, or synthetically generated voice), for example. Further, in some embodiments, such an alarm (e.g., of step 29b) may include information, such as a statement that airflow restriction is excessive or exceeds recommended parameters. In some embodiments, an indication of the airflow rate, the percentage of target airflow rate, the amount of airflow restriction, or a combination thereof, may be provided. In different embodiments, when or after an alarm is provided (e.g., step 29b), method 20 may proceed, for example, to select the first formula (step 26b), or in some embodiments, may turn off the air conditioning or air-handling unit. Such an alarm (e.g., of step 29b) may alert an installation technician, owner, or the like, that excessive airflow restriction exists, upon which information the technician or owner may open registers, replace or clean a filter, provide less-restrictive ductwork, select a smaller air-handling or air conditioning unit, or the like, as examples.

Various embodiments of systems, units, and methods are contemplated wherein the first present parameter (e.g., for which a first representation is sampled in step 23a) is the present speed of the fan motor (e.g., in an variable frequency AC configuration) or the first present parameter is the present torque of the fan motor (e.g., in a variable voltage DC configuration). In many embodiments, the second present parameter (e.g., for which a second representation is sampled in step 24a) is the present current of the fan motor or the second present parameter is a present pressure within the ventilation system. All potential combinations of these two parameters are alternative embodiments providing particular advantages in specific applications.

In many embodiments, it is not necessary to measure airflow rate (e.g., of supply air 16s, return air 16r, or both, as shown in FIG. 1) directly, for example, with airflow measuring instrumentation, such as a Pitot tube, an anemometer (for example, with a rotating vane or hot wire), etc. Further, in some embodiments, it is not necessary to measure airflow rate indirectly, for example, by measuring a pressure drop or differential across a restriction, such as that provided by coil or evaporator 15e. Further, in some embodiments, it is not necessary to measure a pressure at all. In one such example, motor speed and motor electric current are measured. In another such example, motor torque and motor electric current are measured. Both such examples are described herein. However, in other embodiments, in many embodiments, pressure can be substituted for motor electric current, if desired. Depending on the circumstances, these alternatives may provide distinct advantages to optimize airflow control performance, minimize equipment, such as computational resource requirements, or a combination thereof, as examples.

FIG. 7 illustrates another example of an embodiment of the invention, method 70, which illustrates, among other things, an example of a method of providing more-consistent performance of air conditioning units that are mass produced and installed in a variety of structures having a variety of different ductwork configurations with different amounts of airflow restriction. In this example, method 70 includes (at least) the steps of obtaining or providing air conditioning units (step 71) and obtaining or providing a control system (step 72). In different embodiments, these two steps may be performed in either order or concurrently. In various embodiments, at least a plurality of air conditioning units may be obtained or provided (step 71), and in some embodiments, each air conditioning unit may include a cooling coil, a blower or fan configured to blow air through the cooling coil and to the space or structure, and an electric blower or fan motor connected to and configured to turn the blower or fan. Referring to FIG. 1, examples of such equipment include, air-handling or air conditioning unit 10, cooling or evaporator coil 15e, blower or fan 12a configured (as shown) to blow air through the cooling or evaporator coil 15a and to the structure 19, and electric blower or fan motor 13a connected to and configured to turn blower or fan 12a.

In addition, the step of obtaining or providing a control system (step 72) may include obtaining or providing a control system configured use one or more of the embodiments of method 20 described above, or other methods described herein, to control the blower or fan motor (e.g., 13a) to at least partially compensate for the different amounts of the airflow restriction of the different ductwork configurations (e.g., of ductwork 16a, 16b, registers 16w, 16x, and 16y, return air grille 16z, filter 16f, or a combination thereof). In some embodiments, the use of method 20, or other methods, may be accomplished by controller 14 shown in FIG. 1, and may be embodied in software, firmware, read only memory (ROM) erasable programmable read only memory (EPROM) or the like initially installed on or later installed within or on controller 14, for example.

In some such embodiments of method 70, each of the plurality of air conditioning units (e.g., air-handling unit 10) further includes an expansion valve (e.g., 17b), a compressor (e.g., 17a), a compressor motor (e.g., 13c) connected to and configured to turn the compressor (e.g., 17a), a condenser coil (e.g., 15c), a condenser fan (e.g., 12b) configured to blow air (e.g., outside air 16o, which becomes exhaust air 16e) through the condenser (e.g., 15c), and a condenser fan motor (e.g., 13b) connected to and configured to turn the condenser fan (e.g., 12b). In many such embodiments, the cooling coil (e.g., 15e) is an evaporator coil, and the present input setting (e.g., of step 22 shown in FIG. 2) is initially selected to provide a predicted airflow rate within the ventilation system (e.g., of supply air 16s, return air 16r, or both, within ventilation system 10s) that is less than the target airflow rate. Examples of many such embodiments, are described herein.

Furthermore, various aspects and methods described herein may be used to control fluid flow rates for other applications, including for maintaining a substantially constant flow rate. Some elements, parameters, measurements, functions, components, and the like may be described herein as being required, but may only be required in certain embodiments. Further, needs, objects, benefits, other advantages, and solutions to problems have been described herein with regard to specific embodiments. However, the needs, objects, benefits, advantages, solutions to problems, and element(s) that may cause benefit, advantage, or solution to occur or become more pronounced are not to be construed as critical, required, or essential features or elements of the claims or the invention. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. An air-handling unit for ventilating an at-least partially enclosed space, the air-handling unit comprising:
   a first fan configured to blow air through the air-handling unit to the space;
   an electric first motor connected to and configured to turn the first fan;
   a drive unit powering the electric first motor wherein the drive unit produces a variable frequency AC output or a variable voltage DC output to the electric first motor;
   a current sensor measuring electrical current into the drive unit; and
   a control system configured to use an input to control and vary speed of the electric first motor by controlling the drive unit, wherein the input is a representation of the electrical current into the drive unit obtained from the current sensor, and wherein the control system is configured to vary the speed of the electric first motor to obtain a substantially fixed airflow rate through the air-handling unit over a range of varying amount of airflow restriction, and wherein the control system includes instructions to repeatedly calculate a preliminary new speed, and calculation of the preliminary new speed includes multiplying a speed of a present input setting times a target speed, and dividing by a speed at which a present motor current would be predicted to occur in a nominal ventilation system, wherein the target speed is a speed at which a target airflow rate would be predicted to occur in the nominal ventilation system in which a nominal airflow restriction would be encountered at a nominal design airflow rate and the present motor current is a present electrical current into the drive unit measured using the current sensor.

2. The air-handling unit of claim 1 further comprising a first heat-transfer coil configured and positioned so that the air blown by the first fan through the air-handling unit passes through the first heat-transfer coil, a fluid passes through the first heat-transfer coil, and heat is transferred via the first heat-transfer coil between the air and the fluid.

3. The air-handling unit of claim 2 wherein the air-handling unit is an air conditioning unit, the fluid is a refrigerant, and the first heat-transfer coil is an evaporator coil.

4. The air-handling unit of claim 3 further comprising, within an enclosure for the air-handling unit, an expansion valve, a compressor, an electric second motor connected to and configured to turn the compressor, a condenser coil, a second fan configured to blow air through the condenser coil, and an electric third motor connected to and configured to turn the second fan.

5. The air-handling unit of claim 1 further comprising a memory storing a look-up table that expresses a relationship between an airflow rate of the first fan, the electrical current into the drive unit, and the speed of the electric first motor, and wherein the control system is configured to use the look-up table, a representation of the speed of the electric first motor, and the representation of the electrical current into the drive unit to calculate a representation of a present airflow rate of the first fan.

6. The air-handling unit of claim 1, wherein the electrical current into the drive unit is AC electrical current and the current sensor comprises a coil surrounding an electrical power lead.

7. An air-handling unit for ventilating an at-least partially enclosed space, the air-handling unit comprising:
a first fan configured to blow air through the air-handling unit to the space;
an electric first motor connected to and configured to turn the first fan;
a drive unit powering the electric first motor wherein the drive unit produces a variable frequency AC output or a variable voltage DC output to the electric first motor;
a current sensor measuring electrical current into the drive unit; and
a control system configured to use an input to control and vary torque of the electric first motor by controlling the drive unit, wherein the input is a representation of the electrical current into the drive unit obtained from the current sensor, and wherein the control system is configured to vary the torque of the electric first motor to obtain a substantially fixed airflow rate through the air-handling unit over a range of varying amount of airflow restriction, and wherein the control system includes instructions to repeatedly calculate a preliminary new torque, and calculation of the preliminary new torque includes multiplying a torque of a present input setting times a target torque, and dividing by a torque at which a present motor current would be predicted to occur in a nominal ventilation system, wherein the target torque is a torque at which a target airflow rate would be predicted to occur in the nominal ventilation system in which a nominal airflow restriction would be encountered at a nominal design airflow rate at a present electrical current into the drive unit measured using the current sensor.

8. The air-handling unit of claim 1 wherein the control system is further configured to perform, or to output instructions to perform, steps of:
starting the electric first motor;
operating the electric first motor at a present input setting, wherein the present input setting comprises a present motor speed setting
sampling a first representation of a first present parameter of the ventilation system, wherein the first present parameter comprises a present speed of the electric first motor;
before, during, or after the step of sampling the first representation, sampling a second representation of a second present parameter of the ventilation system, wherein the second present parameter comprises the electrical current into the drive unit;
calculating a third representation of a present airflow rate within the ventilation system using the first representation, the second representation, and a look-up table that expresses relationships between an airflow rate of the first fan, the electrical current into the drive unit, and the speed of the electric first motor;
calculating a new input setting using the third representation of the present airflow rate and a fourth representation of a target airflow rate;
changing the present input setting to the new input setting; and
repeating at least a plurality of times the steps of sampling the first representation, sampling the second representation, calculating the third representation of the present airflow rate, calculating the new input setting, and changing the present input setting to the new input setting.

9. The air-handling unit of claim 8 wherein the control system is further configured to perform, after the step of calculating the third representation, a step of evaluating whether the present airflow rate is within a range of the target airflow rate, and if the present airflow rate is not within the range of the target airflow rate, then the step of calculating the new input setting includes using a first formula to calculate the new input setting, and if the present airflow rate is within the range of the target airflow rate, then the step of calculating the new input setting includes using a second formula to calculate the new input setting, wherein the first formula converges on the target airflow rate more quickly than the second formula.

10. The air-handling unit of claim 8 wherein, for at least an initial present input setting:
the step of sampling the second representation of the second present parameter includes sampling the second representation at least a plurality of times and evaluating stabilization of the second present parameter; and
the third representation, which is used to calculate the new input setting, to which the present input setting is changed, is calculated using samples of the second representation taken after the second present parameter has substantially stabilized.

11. The air-handling unit of claim 8 wherein the present input setting is initially selected to provide a predicted airflow rate within the ventilation system that is less than the target airflow rate, and wherein the new input setting is selected to provide a new airflow rate that is less than the target airflow rate, to avoid overshooting the target airflow rate.

12. The air-handling unit of claim 8 wherein the target airflow rate is fixed at a constant value.

13. The air-handling unit of claim 8 wherein the second present parameter is AC electrical current into the drive unit.

14. The air-handling unit of claim 1 wherein the air-handling unit is a mass-produced air conditioning unit for providing more-consistent airflow in a variety of residential structures having a variety of different ductwork configurations with different amounts of airflow restriction, the air conditioning unit further comprising an evaporator coil; wherein the first fan is configured to move air through the evaporator coil to the space; and wherein the control system is configured to use a first input and a second input to control and vary the speed of the electric first motor, and wherein the control system is configured to continuously sample the first input and the second input and vary the speed of the electric first motor to obtain a substantially fixed airflow rate through the evaporator coil over a range of varying amount of airflow restriction.

15. The air conditioning unit of claim 14 wherein the first input is a representation of the speed of the electric first motor.

16. The air-handling unit of claim 1 wherein the drive unit produces a variable frequency AC output to the electric first motor.

17. The air-handling unit of claim 1 wherein the drive unit produces a variable voltage DC output to the electric first motor.

18. The air-handling unit of claim 1 wherein the control system is further configured to use a representation of the speed of the electric first motor, in addition to the representation of the electrical current into the drive unit, to control and vary the speed of the electric first motor.

19. The air-handling unit of claim 18 wherein the representation of the speed of the electric first motor is obtained without using a sensor.

20. The air-handling unit of claim 18 wherein the representation of the speed of the electric first motor is a present or temporary value generated internally within the control system.

21. The air-handling unit of claim 18 wherein the representation of the speed of the electric first motor is an output to the drive unit from the control system.

22. The air-handling unit of claim 18, wherein the electrical current into the drive unit is AC electrical current.

23. The air-handling unit of claim 1, wherein the electrical current into the drive unit is AC electrical current.

24. The air-handling unit of claim 7, wherein the electrical current into the drive unit is AC electrical current.

25. The air-handling unit of claim 7, wherein the control system is further configured to use a representation of the torque of the electric first motor, in addition to the representation of the electrical current into the drive unit, to control and vary the torque of the electric first motor.

26. The air-handling unit of claim 7 further comprising a memory storing a look-up table that expresses a relationship between an airflow rate of the first fan, the electrical current into the drive unit, and the torque of the electric first motor, and wherein the control system is configured to use the look-up table, a representation of the torque of the electric first motor, and the representation of the electrical current into the drive unit to calculate a representation of a present airflow rate of the first fan.

* * * * *

UNITED STATES PATENT AND TRADEMARK OFFICE
CERTIFICATE OF CORRECTION

PATENT NO.         : 8,672,733 B2                                        Page 1 of 1
APPLICATION NO.    : 11/703518
DATED              : March 18, 2014
INVENTOR(S)        : Jie Chen et al.

It is certified that error appears in the above-identified patent and that said Letters Patent is hereby corrected as shown below:

IN THE SPECIFICATIONS:

In column 11, line 4 and line 12, delete the "0" in the number "160" and in its place, insert the small letter --o--, i.e., "16o".

Signed and Sealed this
Twentieth Day of May, 2014

Michelle K. Lee
*Deputy Director of the United States Patent and Trademark Office*